(12) United States Patent
Hwang et al.

(10) Patent No.: US 10,873,956 B2
(45) Date of Patent: Dec. 22, 2020

(54) METHOD AND NB WIRELESS DEVICE FOR DETERMINING WHETHER OR NOT TO TRANSMIT SR

(71) Applicant: LG Electronics Inc., Seoul (KR)

(72) Inventors: Seunggye Hwang, Seoul (KR); Joonkui Ahn, Seoul (KR); Suckchel Yang, Seoul (KR); Changhwan Park, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/381,699

(22) Filed: Apr. 11, 2019

(65) Prior Publication Data

US 2019/0239239 A1    Aug. 1, 2019

Related U.S. Application Data

(63) Continuation of application No. 16/366,685, filed on Mar. 27, 2019, which is a continuation of application No. PCT/KR2018/003364, filed on Mar. 22, 2018.
(Continued)

(51) Int. Cl.
*H04W 72/12* (2009.01)
*H04W 72/04* (2009.01)
(Continued)

(52) U.S. Cl.
CPC .............. *H04W 72/12* (2013.01); *H04L 1/08* (2013.01); *H04L 1/1671* (2013.01);
(Continued)

(58) Field of Classification Search
None
See application file for complete search history.

(56) References Cited

U.S. PATENT DOCUMENTS

| 2011/0205981 A1 | 8/2011 | Koo et al. |
| 2013/0242730 A1 | 9/2013 | Pelletier et al. |

(Continued)

FOREIGN PATENT DOCUMENTS

| JP | 2011523265 | 8/2011 |
| JP | 2013-507067 | 2/2013 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP TS 36.211 V10.4.0 (Dec. 2011), 101 pages.
(Continued)

*Primary Examiner* — Kodzovi Acolatse
(74) *Attorney, Agent, or Firm* — Fish & Richardson P.C.

(57) ABSTRACT

One disclosure of the present application provides a method for a narrowband (NB) wireless device to determine whether or not to transmit a scheduling request (SR). The method may comprise a step of determining whether or not to transmit an SR by using a resource for the transmission of a hybrid automatic retransmit request (HARQ) acknowledgement/negative acknowledgement (ACK/NACK) signal. The step of determination may be performed if one or more HARQ processes are run. The resource for the HARQ ACK/NACK signal may include a narrowband physical uplink shared channel (NPUSCH).

17 Claims, 19 Drawing Sheets

Related U.S. Application Data

(60) Provisional application No. 62/523,243, filed on Jun. 21, 2017, provisional application No. 62/501,108, filed on May 4, 2017, provisional application No. 62/475,881, filed on Mar. 24, 2017.

(51) Int. Cl.

| | | |
|---|---|---|
| *H04L 1/18* | (2006.01) | |
| *H04L 1/16* | (2006.01) | |
| *H04L 27/26* | (2006.01) | |
| *H04L 1/08* | (2006.01) | |
| *H04L 5/00* | (2006.01) | |
| *H04L 27/36* | (2006.01) | |

(52) U.S. Cl.
CPC .......... *H04L 1/1812* (2013.01); *H04L 1/1861* (2013.01); *H04L 1/1896* (2013.01); *H04L 5/00* (2013.01); *H04L 5/0053* (2013.01); *H04L 27/26* (2013.01); *H04L 27/36* (2013.01); *H04W 72/0466* (2013.01)

(56) References Cited

U.S. PATENT DOCUMENTS

| | | | | |
|---|---|---|---|---|
| 2016/0255654 | A1* | 9/2016 | Lin | H04L 5/0048 370/329 |
| 2016/0295637 | A1* | 10/2016 | Bergquist | H04W 76/00 |
| 2016/0337157 | A1 | 11/2016 | Papasakellariou | |
| 2017/0041119 | A1* | 2/2017 | Ang | H04L 5/14 |
| 2017/0207894 | A1 | 7/2017 | Wang et al. | |
| 2017/0367058 | A1* | 12/2017 | Pelletier | H04W 56/0045 |
| 2018/0206271 | A1* | 7/2018 | Chatterjee | H04L 5/0053 |
| 2018/0227958 | A1* | 8/2018 | Xiong | H04W 72/0406 |
| 2018/0279324 | A1* | 9/2018 | Wang | H04L 5/0055 |
| 2018/0279363 | A1* | 9/2018 | Su | H04W 74/0833 |
| 2019/0020381 | A1* | 1/2019 | Tooher | H04W 72/0406 |
| 2019/0124699 | A1* | 4/2019 | Yamada | H04L 27/26 |
| 2020/0022173 | A1 | 1/2020 | Luo et al. | |

FOREIGN PATENT DOCUMENTS

| | | |
|---|---|---|
| JP | 2013-527664 | 6/2013 |
| WO | WO2018170924 | 9/2018 |
| WO | WO2018175764 | 9/2018 |

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 9)", 3GPP TS 36.323 V9.0.0 (Dec. 2009), 24 pages.

"3rd Generation Partnership Project; Technical Specification Group Radio Access Network; Evolved Universal Terrestrial Radio Access (E-UTRA); Radio Link Control (RLC) protocol specification (Release 9)", 3GPP TS 36.322 V9.1.0 (Mar. 2010), 39 pages.

Nokia Networks, Alcatel-Lucent, Alcatel-Lucent Shanghai Bell, "UCI for NB-IoT", R1-161852, 3GPP TSG-RAN WG1 NB-IoT Ad-Hoc Meeting, Sophia Antipolis, France, Mar. 22-24, 2016, 5 pages.

ZTE, "UCI transmission for NB-IoT", R1-161871, 3GPP TSG RAN WG1 NB-IoT Ad-Hoc Meeting, Sophia Antipolis, France, Mar. 22-24, 2016, 7 pages.

Intel Corporation, "UCI and DL HARQ-ACK feedback for NB-IoT", R1-161902, 3GPP TSG RAN WG1 NB-IoT Ad-Hoc Meeting #2, Sophia Antipolis, France, Mar. 22-24, 2016, 9 pages.

Nokia, Alcatel-Lucent Shanghai Bell, "Remaining issues on UCI", R1-162907, 3GPP TSG-RAN WG1 Meeting #84bis, Busan, Korea, Apr. 11-15, 2016, 5 pages.

Nokia, Alcatel-Lucent Shanghai Bell, "Scheduling Request Multiplexing with ACK/NACK", R1-166593, 3GPP TSG-RAN WG1 Meeting #86, Gothenburg, Sweden, Aug. 22-26, 2016, 4 pages.

United States Office Action in U.S. Appl. No. 16/366,685, dated Jun. 10, 2019, 14 pages.

Ericsson, "On new NPUSCH Format 2 for supporting the ACK/NACK feedbacks of two NPDSCH HARQ processes," R1-1701893, 3GPP TSG-RAN1#88, Athens, Greece, Feb. 13-17, 2017, 7 pages.

ZTE , ZTE Microelectronics, "Discussion on physical layer scheduling request for NB-IoT," R1-1705487, 3GPP TSG RAN WG1 Meeting #88bis, Spokane, USA, Apr. 3-7, 2017, 3 pages.

United States Final Office Action in U.S. Appl. No. 16/366,685, dated Oct. 2, 2019, 16 pages.

Extended European Search Report in European Application No. 18771851.5, dated Oct. 9, 2019, 9 pages.

U.S. Office Action in U.S. Appl. No. 16/366,685, dated Mar. 18, 2020, 12 pages.

Huawei, CR:Cleanup for the NB-IoT NPUSCH conformance test(R14), R4-1701107, 3GPP TSG-RAN WG4 Meeting #82, Athens, Greece, Feb. 13-17, 2017, 6 pages.

Japanese Office Action in Japanese Appln. No. 2019-529968, dated Jun. 23, 2020, 5 pages (with English translation).

Korean Notice of Allowance in Korean Appln. No. 10-2020-7000502, dated Sep. 21, 2020, 7 pages (with English translation).

Japanese Office Action in Japanese Appln. No. 2019-529968, dated Sep. 29, 2020, 6 pages (with English translation).

\* cited by examiner

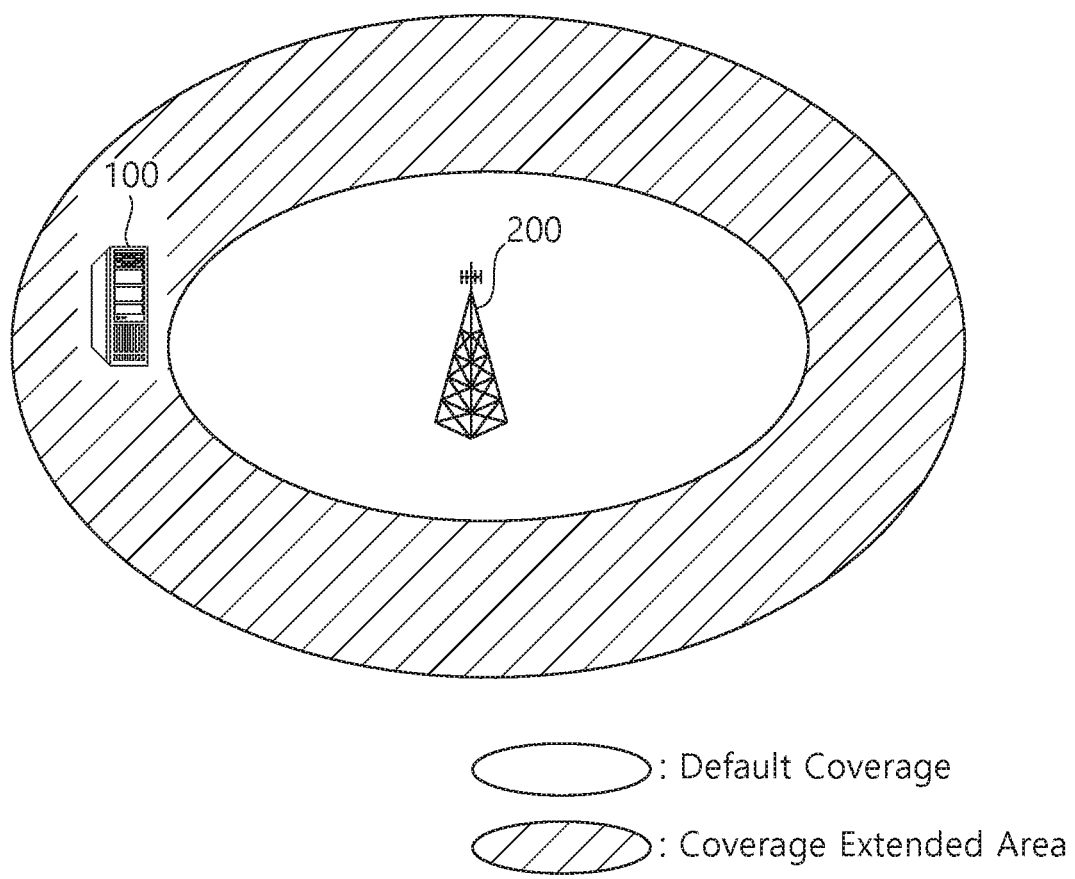

SR with BSR procedure

SR without BSR procedure

METHOD AND NB WIRELESS DEVICE FOR DETERMINING WHETHER OR NOT TO TRANSMIT SR

CROSS-REFERENCE TO RELATED APPLICATIONS

This application is a continuation of Ser. No. 16/366,685, filed on Mar. 27, 2019, which is a continuation of International Application PCT/KR2018/003364, filed on Mar. 22, 2018, which claims the benefit of U.S. Provisional Applications Nos. 62/475,881 filed on Mar. 24, 2017, 62/501,108 filed on May 4, 2017, and 62/523,243 filed on Jun. 21, 2017, the contents of which are hereby incorporated by reference herein in their entirety.

BACKGROUND OF THE INVENTION

Field of the Invention

The present invention relates to mobile communication.

Related Art

Interest in next-generation, i.e., fifth generation (5G) mobile communication is growing and research thereon is being rapidly conducted owing to success of LTE (Long Term Evolution)/LTE-Advanced (LTE-A) for fourth generation mobile communication.

According to LTE/LTE-A, a UE can transmit a scheduling request (SR) to be allocated uplink resources. The SR can be transmitted in a predetermined transmission-possible subframe.

Recently, IoT (Internal of Things) communication has been under the spotlight. IoT communication is characterized in that the quantity of transmitted data is small and uplink or downlink data transmission and reception rarely occur.

Accordingly, techniques for causing IoT devices to operate in a reduced bandwidth irrespective of the system bandwidth of a cell have been proposed. IoT communication performed in such a reduced bandwidth is called NB (Narrow Band) IoT communication.

However, an SR procedure is not provided in NB-IoT systems.

SUMMARY OF THE INVENTION

Therefore, an object of the disclosure of the present application is to provide an SR procedure for NB IoT devices.

To achieve the foregoing purposes, the disclosure of the present invention proposes a method for determining whether to transmit a scheduling request (SR). The method may be performed by a narrowband (NB) wireless device and comprise: determining whether to transmit an SR using a resource for transmission of a hybrid automatic retransmit request (HARQ) acknowledgement/negative acknowledgement (ACK/NACK) signal. The determining may be performed when one or more HARQ processes are executed. The resource for transmission of the HARQ ACK/NACK signal may include a narrowband physical uplink shared channel (NPUSCH).

The determining may be performed based on a new data indicator (NDI).

The SR may be transmitted when the NDI indicates transmission of new data.

The determining may be performed based on a redundancy version (RV).

The NPUSCH may include a bit indicating whether the SR is transmitted.

A codeword cover may be applied to one or more orthogonal frequency division multiplexing (OFDM) symbols to which the NPUSCH is mapped when the SR is transmitted.

The NPUSCH may be modulated based on quadrature phase shift keying (QPSK) when the SR is transmitted.

Whether to transmit the SR may be determined according to information included in downlink control information (DCI).

To achieve the foregoing purposes, the disclosure of the present invention proposes an NB wireless device for determining whether to transmit an SR. The wireless device may comprise: a transceiver; and a processor for controlling the transceiver and determining whether to transmit an SR using a resource for transmission of a hybrid automatic retransmit request (HARQ) acknowledgement/negative acknowledgement (ACK/NACK) signal. The determining may be performed when one or more HARQ processes are executed. The resource for transmission of the HARQ ACK/NACK signal may include a narrowband physical uplink shared channel (NPUSCH).

According to the disclosure of the present invention, the problem of the conventional technology described above may be solved.

BRIEF DESCRIPTION OF THE DRAWINGS

FIG. 6B is an illustration of cell coverage expansion or enhancement for an IoT device.

DESCRIPTION OF EXEMPLARY EMBODIMENTS

Figure 1:
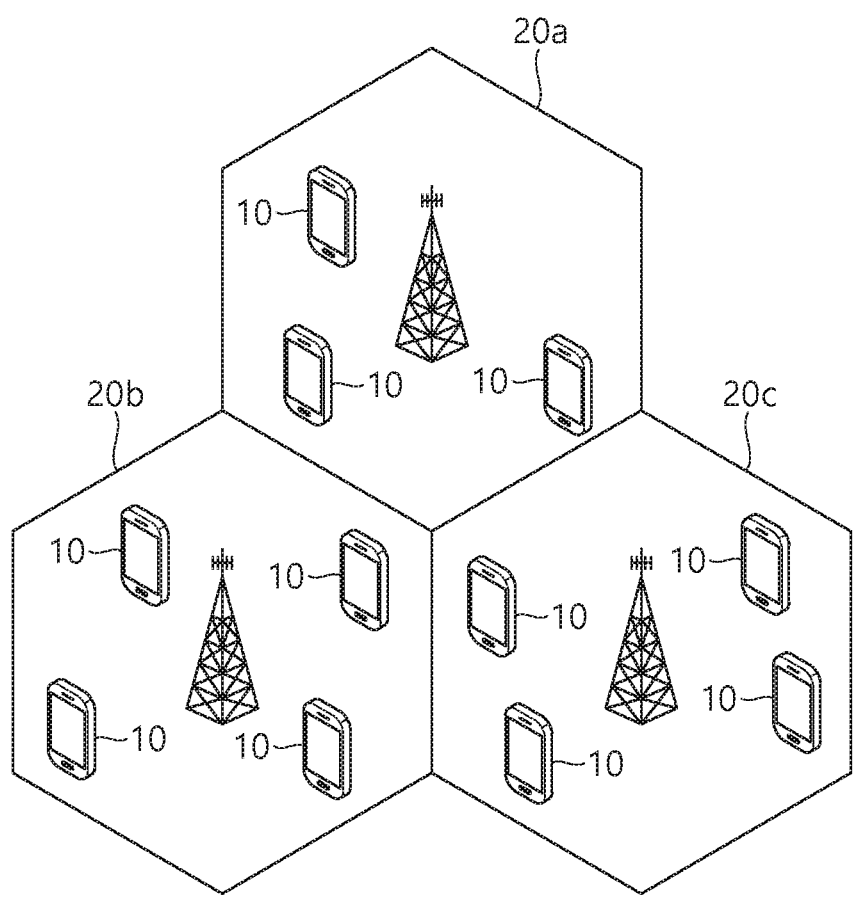
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term "include" or "have" may represent the existence of a feature, a number, a step, an operation, a component, a part or the combination thereof described in the present invention, and may not exclude the existence or addition of another feature, another number, another step, another operation, another component, another part or the combination thereof.

The terms "first" and "second" are used for the purpose of explanation about various components, and the components are not limited to the terms "first" and "second". The terms "first" and "second" are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, "base station" generally refers to a fixed station that communicates with a wireless device and may be denoted by other terms such as eNB (evolved-NodeB), BTS (base transceiver system), or access point.

As used herein, "user equipment (UE)" may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
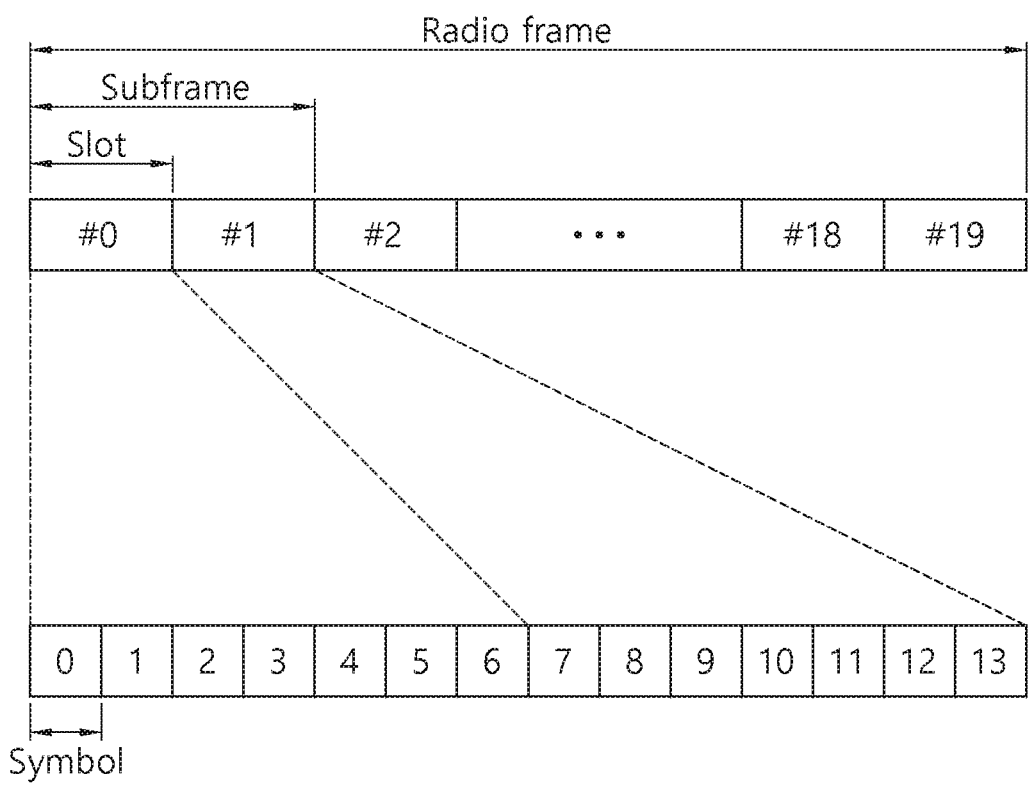
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

One slot includes $N_{RB}$ resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 3:
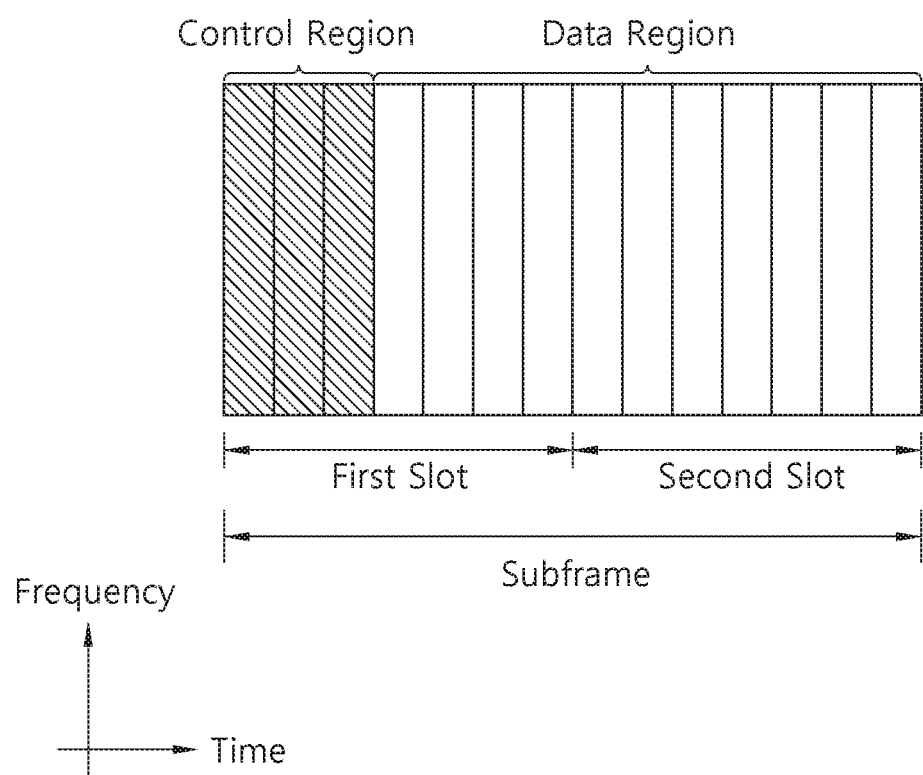
FIG. 3 illustrates a structure of a downlink radio frame according to TDD in 3GPP LTE.

FIG. 3 illustrates the architecture of a downlink radio frame according to TDD in 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Scheduling Request (SR)>

A UE performs an SR procedure in order to be allocated uplink resources from an eNB. An SR includes a PUCCH SR simply serving as a flag which is a 1-bit signal. The SR in the form of a flag was designed to reduce uplink overhead.

When an SR has been triggered, the SR is considered to be pending until it is cancelled. All pending SRs are cancelled if a MAC PDU (protocol data unit) is assembled and includes a PDU including all buffer statuses of a final event or a UL grant is received and the received UL grant can accept all UL data that is pending for transmission.

If an SR is triggered and other pending SRs are not present, an MAC entity sets an SR counter, for example, SR_COUNTER, to 0.

The MAC entity operates as follows for each TTI whenever one SR is pending.

When there is no UL-SCH resource available for transmission in this TTI,
When the MAC entity does not have a valid PUCCH resource configured for an SR in an arbitrary TTI,
the MAC entity performs a random access procedure.
However, when the MAC entity has a valid PUCCH resource configured for an SR in this TTI, the TTI is not a measurement gap, and an SR prohibition timer, e.g., sr-ProhibitTimer, is not operating,
and when SR_COUNTER <dsr-TransMax,
the MAC entity increases SR_COUNTER by 1,
instructs the physical layer to signal the SR on a PUCCH, and
starts sr-ProhibitTimer.
If not,
The MAC entity notifies the RRC layer to release PUCCHs/SRSs for all serving cells.
The MAC entity clears all set downlink allocation and uplink grants.
And, the MAC entity starts a random access procedure.

Meanwhile, an SR can be transmitted in a predetermined transmission-possible subframe.

Figure 4:
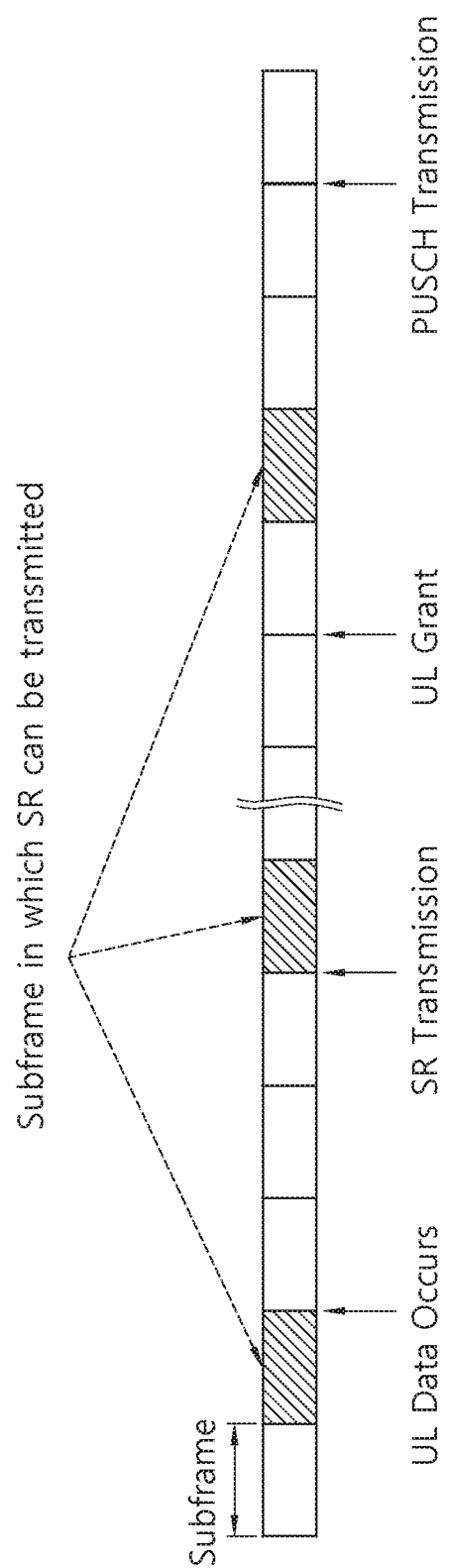
FIG. 4 illustrates an example of a scheduling request (SR) transmission mechanism.

FIG. 4 illustrates an example of an SR (Scheduling Request) transmission mechanism.

In the example of FIG. 4, a UE transmits an SR in a reserved SR transmission-possible subframe when there is no UL grant. The SR transmission may be repeated until a UL grant is received.

The subframe in which the SR is transmitted is a subframe that satisfies the following condition.

$$(10 \times n_f + \lfloor n_s/2 \rfloor - N_{OFFSET,SR}) \bmod SR_{PERIODICITY} = 0 \quad \text{[Mathematical expression 1]}$$

Here, $n_s$ is a slot number and $n_f$ is a system frame number (SFN) for a radio frame.

$SR_{PERIODICITY}$ is SR transmission periodicity and $N_{OFFSET,SR}$ is an SR subframe offset. $SR_{PERIODICITY}$ and $N_{OFFSET,SR}$ are SR configuration and are determined according to the following table using a parameter sr-ConfigIndex $I_{SR}$ transmitted from an eNB through higher layer signaling (e.g., RRC signaling).

TABLE 2

| SR configuration index $I_{SR}$ | SR periodicity (ms) $SR_{PERIODICITY}$ | SR subframe offset $N_{OFFSET,SR}$ |
|---|---|---|
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155-156 | 2 | $I_{SR}$-155 |
| 157 | 1 | $I_{SR}$-157 |

<Buffer Status Reporting (BSR)>

Hereinafter, buffer status reporting (BSR) will be described.

A BSR procedure is used to provide information about the quantity of data available for transmission in a UL buffer of a UE to an eNB which provides a service.

In other words, the eNB providing the service needs to know the type and quantity of data desired to be transmitted by each UE in order to efficiently use uplink radio resources. With respect to downlink radio resources, data to be transmitted through downlink is transmitted from an access gateway to an eNB providing a service and thus the eNB providing the service can be aware of the quantity of data that needs to be transmitted to each UE through downlink. On the other hand, with respect to uplink radio resources, the eNB providing the service cannot be aware of the quantity of uplink radio resources required for each UE unless a UE signals information about data to be transmitted through uplink to the eNB providing the service. Accordingly, in order for the eNB providing the service to appropriately allocate uplink radio resources to a UE, the UE is required to provide information for uplink radio resource scheduling to the eNB providing the service.

Accordingly, when the UE has data to be transmitted to the eNB providing the service, the UE notifies the eNB providing the service that the UE has data to be transmitted to the eNB and the eNB allocates appropriate uplink radio resources to the UE on the basis of the information. This procedure is referred to as a buffer status reporting (BSR) procedure.

A UE requires uplink radio resources to transmit BSR to an eNB providing a service. If uplink radio resources have been allocated when the BSR is triggered, the UE immediately transmits the BSR to the eNB providing the service using the allocated uplink radio resources. If the UE does not have allocated uplink radio resources when the BSR is triggered, the UE starts a scheduling request (SR) procedure for receiving uplink radio resources from the eNB providing the service.

For the BSR procedure, the UE may consider all radio bearers that are not suspended or consider suspended radio bearers.

BSR is triggered when any predefined event occurs. BSR can be classified into three BRS, regular BSR, padding BSR and periodic BSR, according to events that have occurred.

The regular BSR can be triggered when uplink data can be transmitted in an RLC entity or a PDCP entity for a logical channel belonging to a logical channel group (LCG). Data regarded as transmittable data has been defined in 3GPP TS 36.322 V9.1.0 (2010-03) section 4.5 and 3GPP TS 36.323 V9.0.0 (2009-12) section 4.5. The regular BSR can be triggered when the data belongs to a logical channel having a higher priority than the priority of logical channels belonging to any LCG and data transmission therefor is possible. The regular BSR can also be triggered when data that can be transmitted for any logical channel belonging to the LCG is not present.

The padding BSR can be triggered when uplink resources are allocated and the number of padding bits is equal to or greater than the sum of a BSR MAC control element (CE) and a sub-header.

The regular BSR can be triggered when a retransmission BSR timer expires and the UE has data that can be transmitted for any logical channel belonging to the LCG.

The periodic BSR can be triggered when a periodic BSR timer expires.

Figure 5:
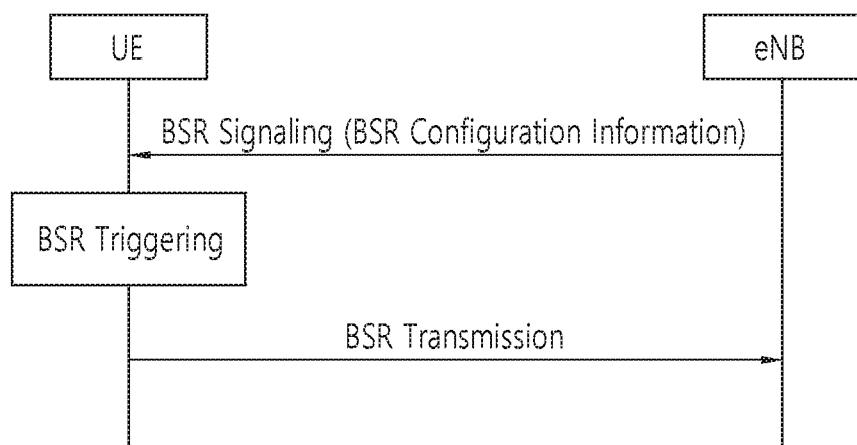
FIG. 5 illustrates a buffer status reporting (BSR) procedure.

FIG. 5 illustrates a BSR procedure.

Referring to FIG. 5, an eNodeB 200 controls a BSR procedure associated with a logical channel in each UE through MAC-MainConfig signal transmission defined in the RRC layer. The RRC message includes information in a BSR period timer periodicBSR-timer and/or a BSR retransmission timer retxBSR-timer. Further, the RRC message includes configuration information associated with a BSR format and a data size.

The UE can trigger BSR at any time.

The UE can transmit a BSR report upon BSR triggering. The BSR is configured in consideration of configuration information established by RRC signal delivery.

<IoT (Internet of Things) Communication>

Hereinafter, IoT will be described.

Figure 6A:
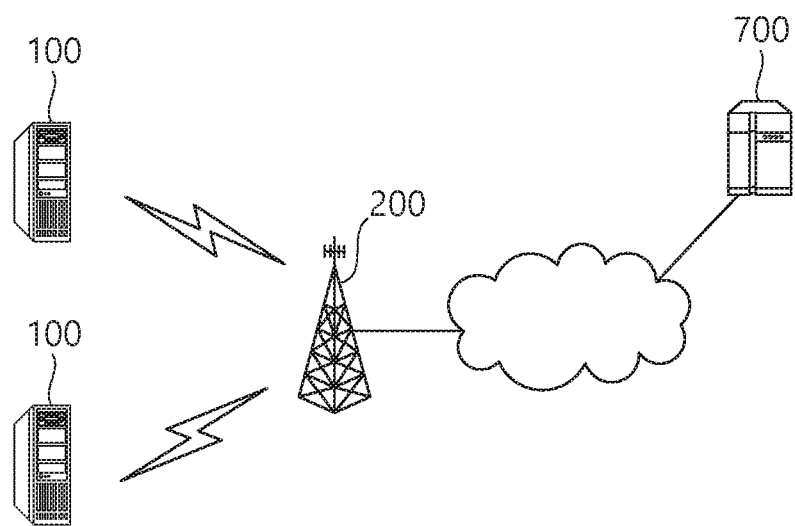
FIG. 6A illustrates an example of IoT (Internet of Things) communication.

FIG. 6A illustrates an example of IoT (Internet of Things) communication.

IoT refers to information exchange between IoT devices 100 without human intersection through an eNB 200 or information exchange between an IoT device 100 and a server 700 through the eNB 200. IoT communication is also called CIoT (Cellular Internet of Things) since IoT communication is performed through a cellar eNB.

Such IoT communication is a kind of MTC (Machine Type Communication). Accordingly, an IoT device may also be called an MTC device.

IoT services differ from services in communication with human intervention and may include services in various categories, such as tracking, metering, payment, medical services and remote control. For example, IoT services may include meter checking, water level measurement, utilization of monitoring cameras, vending machine inventory reporting, etc.

Since IoT communication is characterized in that the quantity of transmitted data is small and uplink or downlink data transmission and reception rarely occur, it is desirable to reduce the price of IoT devices and decrease battery consumption in response to a low data transfer rate. Further, IoT devices have low mobility and thus channel environments hardly change.

FIG. 6B is an illustration of cell coverage expansion or enhancement for an IoT device.

Recently, cell coverage extension or enhancement has been considered for an IoT device 100 and various techniques for cell coverage extension or enhancement are under discussion.

However, in the case of cell coverage extension or enhancement, when an eNB transmits a downlink channel to an IoT device located in a coverage extension (CE) or coverage enhancement (CE) area, the IoT device has difficulty in receiving the downlink channel. Similarly, when the IoT device located in the CE area transmits an uplink channel, the eNB has difficulty in receiving the uplink channel.

To solve such a problem, a downlink channel or an uplink channel may be repeatedly transmitted on a plurality of subframes. Such repeated uplink/downlink channel transmission on a plurality of subframes is referred to as bundle transmission.

Figure 6C:
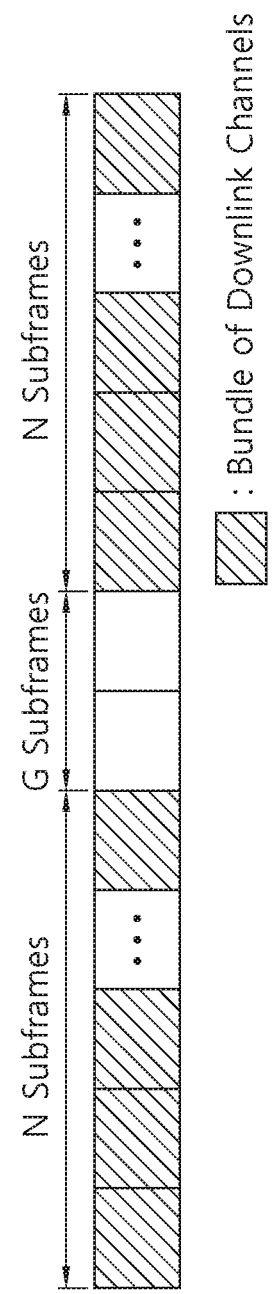
FIG. 6C is an illustration of an example of transmitting a bundle of downlink channels.

FIG. 6C is an illustration of an example of transmitting a bundle of downlink channels.

As seen with reference to FIG. 6C, an eNB repeatedly transmits downlink channel (e.g., a PDCCH and/or a PDSCH) on a plurality of subframes (e.g., N subframes) to an IoT device 100 located in a CE area.

Then, the IoT device or the eNB can increase a decoding success rate by receiving a bundle of downlink/uplink channels on a plurality of subframes and decoding a part of or entire bundle.

Figure 7A:
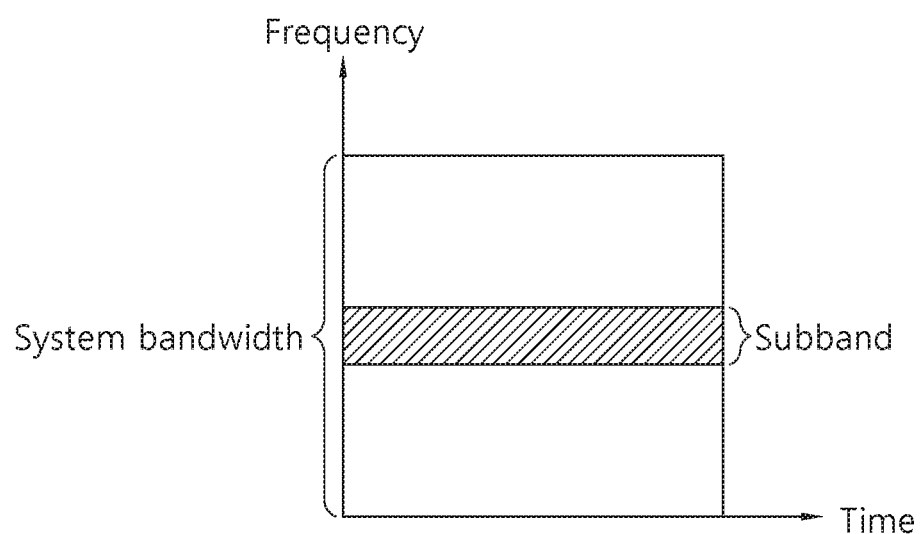
FIGS. 7A and 7B are illustrations of examples of subbands in which an IoT device operates.
Figure 7B:
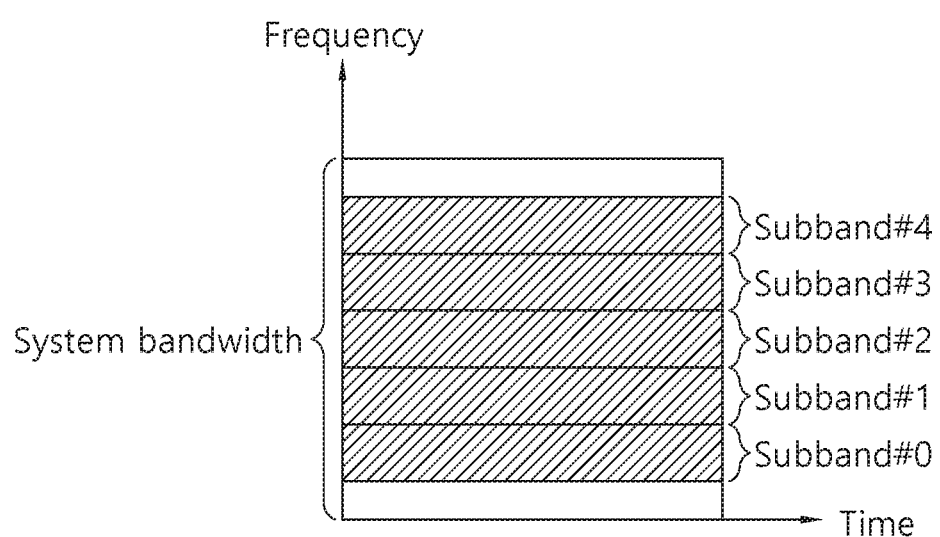

FIGS. 7A and 7B are illustrations of examples of subbands in which an IoT device operates.

As a method for a low-cost IoT device, the IoT device can use a subband of about 1.4 MHz, for example, irrespective of the system bandwidth of a cell, as shown in FIG. 7A.

Here, the area of a subband in which such an IoT device operates may be positioned at the center (e.g., 6 PRBs at the center) of the system bandwidth of the cell, as shown in FIG. 7A.

Alternatively, a plurality of subbands for IoT devices may be provided to one subframe for multiplexing of IoT devices in a subframe such that IoT devices can use different subbands. Here, most IoT devices may use subbands other than the subband at the center (e.g., 6 PRBs at the center) of the system bandwidth of the cell.

Such IoT communication performed in a reduced bandwidth may be called NA (Narrow Band) IoT communication or NB CIoT communication.

Figure 8:
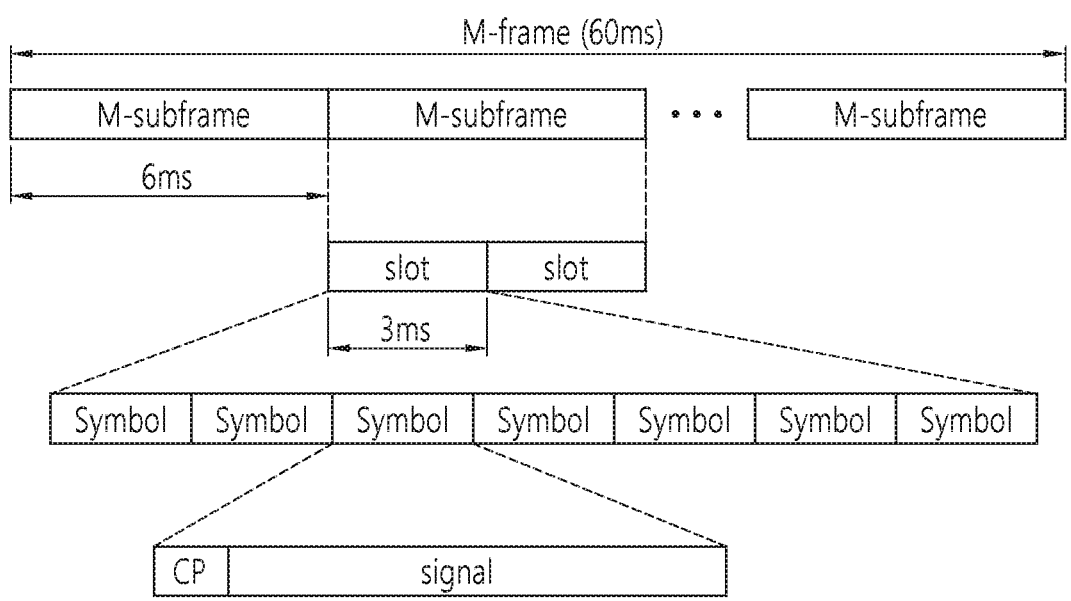
FIG. 8 illustrates an example of representing time resources available for NB-IoT in units of M-frame.

FIG. 8 illustrates an example in which time resources available for NB-IoT are represented in units of M-frame.

Referring to FIG. 8, a frame that can be used for NB-IoT may be called an M-frame and may be 60 ms in length, for example. Further, a subframe that can be used for NB IoT can be called an M-subframe and may be 6 ms in length, for example. Accordingly, an M-frame can include 10 M-subframes.

Each M-subframe can include two slots and each slot may be 3 ms in length, for example.

However, a slot that can be used for NB IoT may be 2 ms in length, differently from the illustration of FIG. 8, and thus a subframe may be 4 ms in length and a frame may be 40 ms in length. This will be described in more detail with reference to FIG. 9.

Figure 9:
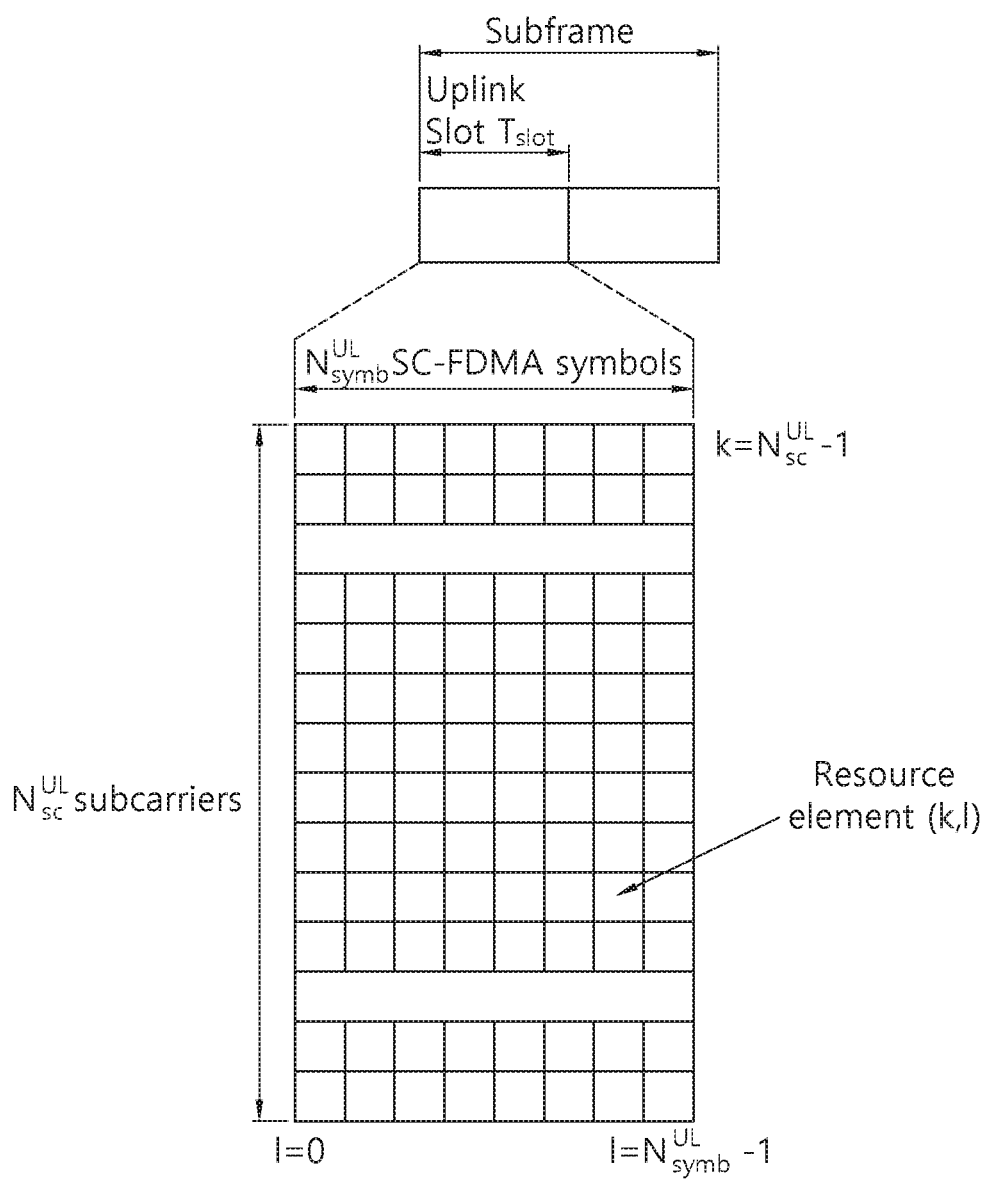
FIG. 9 is another illustration of time resources and frequency resources available for NB IoT.

FIG. 9 is another illustration of time resources and frequency resources available for NB IoT.

Referring to FIG. 9, a physical channel or a physical signal transmitted through a slot on uplink of NB-IoT includes $N_{symb}^{UL}$ SC-FDMA symbols in the time domain and includes $N_{sc}^{UL}$ subcarriers in the frequency domain. Uplink physical channel can be classified into an NPUSCH (Narrowband Physical Uplink Shared Channel) and an NPRACH (Narrowband Physical Random Access Channel). In addition, a physical signal can be an NDMRS (Narrowband DeModulation Reference Signal) in NB-IoT.

In NB-IoT, an uplink bandwidth of $N_{sc}^{UL}$ subcarriers for a slot Toot is as follows.

TABLE 3

| Subcarrier spacing | $N_{sc}^{UL}$ | $T_{slot}$ |
| --- | --- | --- |
| Δf = 3.75 kHz | 48 | 61440 * $T_s$ |
| Δf = 15 kHz | 12 | 15360 * $T_s$ |

In NB-IoT, each resource element (RE) of a resource grid can be defined as an index pair (k, l) in a slot when k=0, . . . , $N_{sc}^{UL}$−1 and l=0, . . . , $N_{symb}^{UL}$−1 which indicate the time domain and the frequency domain. In NB-IoT, downlink physical channels include an NPDSCH (Narrowband Physical Downlink Shared Channel), an NPBCH (Narrowband Physical Broadcast Channel) and an NPDCCH (Narrowband Physical Downlink Control Channel). In addition, downlink physical signals include an NRS (Narrowband Reference Signal), an NSS (Narrowband Synchronization Signal) and an NPRS (Narrowband Positioning Reference Signal). The NSS includes an NPSS (Narrowband Primary Synchronization Signal) and an NSSS (Narrowband Secondary Synchronization Signal).

Meanwhile, NB-IoT is a communication method for wireless devices using reduced bandwidths (i.e., narrow bands) according to low complexity/low cost. Such NB-IoT communication aims at connection of a large number of wireless devices in a reduced bandwidth. Furthermore, NB-IoT communication aims at support of wider cell coverage than cell coverage of LTE communication.

Meanwhile, a subcarrier having a reduced bandwidth includes only one PRB when a subcarrier spacing is 15 kHz as seen with reference to Table 1. That is, NB-IoT communication can be performed using only one PRB. Here, a PRB accessed by a wireless device to receive NPSS/NSSS/NPBCH/SIB-NB on the assumption that NPSS/NSSS/NPBCH/SIB-NB are transmitted from an eNB may be called an anchor PRB (or anchor carrier). The wireless device can be allocated additional PRBs from the eNB in addition to the anchor PRB (or anchor carrier). Here, among the additional PRBs, a PRB through which NPSS/NSSS/NPBCH/SIB-NB is not expected to be received by the wireless device from the eNB may be called a non-anchor PRB (or non-anchor carrier).

<Next-Generation Mobile Communication Network>

Interest in next-generation, i.e., fifth generation (5G) mobile communication is growing and research thereon is being rapidly conducted owing to success of LTE (Long Term Evolution)/LTE-Advanced (LTE-A) for fourth generation mobile communication.

Fifth generation mobile communication defined by the International Telecommunications Union (ITU) provides a data rate of up to 20 Gbps and a perceptible rate of 100 Mbps or higher anyplace. The formal title thereof is "IMT-2020" and fifth generation mobile communication aims at worldwide commercialization in 2020.

ITU suggests three usage scenarios, for example, eMBB (enhanced Mobile BroadBand), mMTC (massive Machine Type Communication) and URLLC (Ultra Reliable and Low Latency Communications).

URLLC refers to a usage scenario that requires high reliability and low delay time. For example, services such as automated driving, factory automation and augmented reality require high reliability and low delay (e.g., delay time of 1 ms or less). The current delay time of 4G (LTE) is statistically 21 to 43 ms (best 10%) and 33 to 75 ms (median). This is insufficient to support services that require delay time of 1 ms or less. eMBB refers to a usage scenario that requires mobile super-wideband.

That is, the 5G mobile communication system aims at higher capacity than 4G LTE and can increase mobile wideband user concentration and support D2D (Device to Device), high stability and MTC (Machine type communication). Further, 5G research and development aim at lower latency and lower battery consumption than those of the 4G mobile communication system in order to realize IoT more efficiently. For such 5G mobile communication, a new radio access technology (New RAT or NR) may be proposed.

In NR, reception from an eNB using a downlink subframe and transmission to the eNB using an uplink subframe can be considered. This method can be applied to a paired spectrum and an unpaired spectrum. A pair of spectra refers to inclusion of two carrier spectra for downlink and uplink operations. For example, one carrier can include a pair of a downlink band and an uplink band in one pair of spectra.

Figure 10:
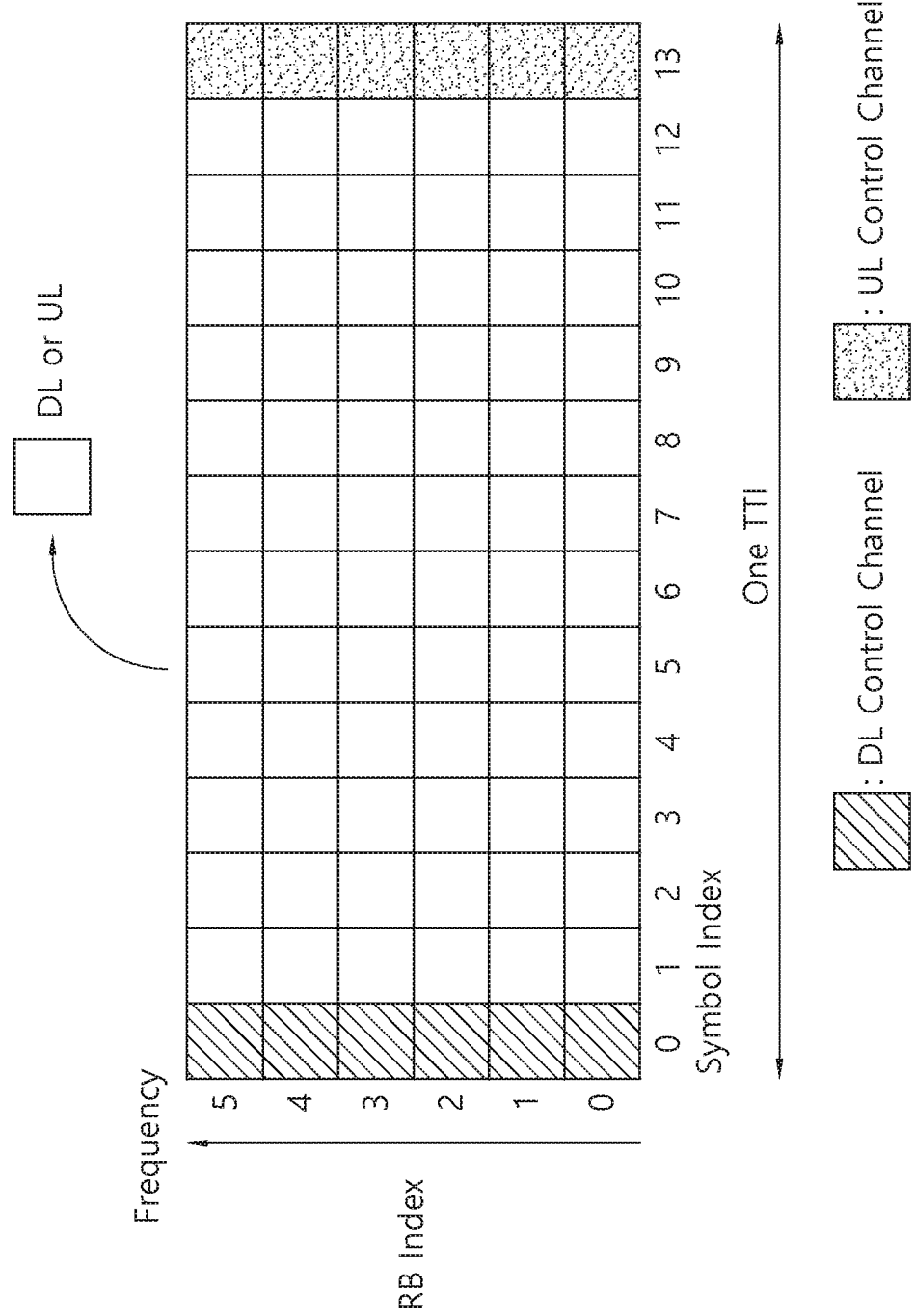
FIG. 10 illustrates an example of a subframe type in NR.

FIG. 10 illustrates an example of a subframe type in NR.

A TTI (Transmission Time Interval) shown in FIG. 10 may be called a subframe or a slot for NR (or new RAT). The subframe (or slot) shown in FIG. 10 can be used in a TDD system of NR (or new RAT) in order to minimize data transmission delay. As shown in FIG. 10, a subframe (or slot) includes 14 symbols as in the current subframe. The symbol at the head of the subframe (or slot) can be used for a DL control channel and the symbol at the end of the subframe (or slot) can be used for a UL control channel. The remaining symbols can be used for DL data transmission or UL data transmission. According to this subframe (or slot) structure, downlink transmission and uplink transmission can be sequentially performed in one subframe (or slot). Accordingly, downlink data can be received in a subframe (or slot) and uplink ACK/NACL may be transmitted in the subframe (or slot). Such a subframe (or slot) structure may be called a self-contained subframe (or slot). When this subframe (or slot) structure is used, a time taken to retransmit data that has failed in reception can be reduced to minimize final data transmission latency. In such a self-contained subframe (or slot) structure, a time gap may be required in a process of transition from a transmission mode to a reception mode or from the reception mode to the transmission mode. To this end, some OFDM symbols when DL switches to UL in the subframe structure can be set to a guard period (GP).

<Support of Various Numerologies>

In future systems, a plurality of numerologies may be provided to a UE with the development of wireless communication technology.

A numerology can be defined by a cycle prefix (CP) length and a subcarrier spacing. On cell can provide a plurality of numerologies to a UE. When the index of a numerology is represented by subcarrier spacings and CP lengths corresponding thereto may be as shown in the following table.

TABLE 4

| M | $\Delta f = 2^\mu \cdot 15$ [kHz] | CP |
|---|---|---|
| 0 | 15 | Normal |
| 1 | 30 | Normal |
| 2 | 60 | Normal, extended |
| 3 | 120 | Normal |
| 4 | 240 | Normal |

In the case of the normal CP, when the index of a numerology is represented by $\mu$ the number $N^{slot}_{symb}$ of OFMD symbols per slot, the number $N^{frame,\mu}_{slot}$ of slots per frame, and the number $N^{subframe,\mu}_{slot}$ of slots per subframe are as shown in the following table.

TABLE 5

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of the extended CP, when the index of a numerology is represented by the number $N^{slot}_{symb}$ of OFMD symbols per slot, the number $N^{frame,\mu}_{slot}$ of slots per frame, and the number $N^{subframe,\mu}_{slot}$ of slots per subframe are as shown in the following table.

TABLE 6

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, each symbol in symbols can be used for downlink or uplink in next-generation mobile communication as shown in the following table. In the following table, uplink is represented by U and downlink is represented by D. In the following table, X indicates a symbol that can be flexibly used as uplink or downlink.

TABLE 7

| For-mat | Symbol number in slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |

TABLE 7-continued

| For-mat | Symbol number in slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | U | U |
| 44 | D | D | D | D | D | D | X | X | X | X | X | X | U | U |
| 45 | D | D | D | D | D | X | X | U | U | U | U | U | U | U |
| 46 | D | D | D | D | D | D | X | D | D | D | D | D | D | X |
| 47 | D | D | D | D | X | X | D | D | D | D | D | X | X |
| 48 | D | X | X | X | X | X | D | X | X | X | X | X | X |
| 49 | X | X | X | X | X | X | D | X | X | X | X | X | X |
| 50 | X | U | U | U | U | U | X | U | U | U | U | U | U |
| 51 | X | X | U | U | U | U | X | X | U | U | U | U | U |
| 52 | X | X | X | U | U | U | X | X | X | U | U | U | U |
| 53 | X | X | X | X | U | U | X | X | X | X | U | U | U |
| 54 | D | D | D | D | X | U | D | D | D | D | D | X | U |
| 55 | D | D | X | U | U | U | D | D | X | U | U | U | U |
| 56 | D | X | U | U | U | U | D | X | U | U | U | U | U |
| 57 | D | D | D | X | X | U | D | D | D | D | X | X | U |
| 58 | D | D | X | X | U | U | D | D | X | X | U | U | U |
| 59 | D | X | X | U | U | U | D | X | X | U | U | U | U |
| 60 | D | X | X | X | X | U | D | X | X | X | X | X | U |
| 61 | D | D | X | X | X | X | U | D | D | X | X | X | X | U |

<Disclosure of Present Specification>

In the legacy LTE system, a UE can receive a UL grant using an SR when the UE has uplink data to be transmitted. However, an SR procedure is no provided in NB-IoT system. Accordingly, an object of the disclosure of the present specification is to provide an SR procedure for NB IoT devices. Although the following description focuses on the NB-IoT system, the present invention can be applied to other systems in which a wireless device performs an SR procedure.

I. First Disclosure

I-1. Dedicated NPRACH Based SR

In this section, a method in which an NB-IoT device uses a random access procedure in order to transmit an SR is proposed. According to the proposed method, an NB-IoT device (or an NB-IoT device group) may use dedicated NPRACH resources. Specifically, an NB-IoT device in an RRC idle state can use a random access procedure in order to perform SR according to the proposition. The NB-IoT device described below may correspond to an NB-IoT device that receives configuration information about an SR in an RRC connected state and then returns to an RRC idle state. However, the proposition can also be applied to a process in which an NB-IoT device performs SR in an RRC connected state. An NPRACH procedure based SR transmission method proposed in this section can be performed along with a process of determining a timing advance (TA) or a transmission power level in an RRC idle state.

I-2. Dedicated NPRACH Resources for SR Transmission

Dedicated NPRACH resources for an SR, mentioned in this section, can be defined as distinguishable radio resources that can be used for an NB-IoT device for the SR. Resources used in the SR transmission method using the dedicated NPRACH can be used through one selected from the following options or a combination thereof.

(Option 1)

All or some of preambles (and/or tone hopping pattern) that can be used for the NPRACH can be determined to be used for an SR as an example of allocating dedicated NPRACH resources. If all available preambles (and/or tone hopping pattern) are used for the SR, NPRACH operation for the SR can be determined to be distinguished from NPRACH operation for radon access using resources of the time, frequency and/or codeword domains. If only some of preambles (and/or tone hopping pattern) are used for the SR, NPRACH operation for the SR can share the time, frequency and/or codeword domains with NPRACH operation for radon access. Here, NPRACH preambles (and/or tone hopping pattern) for random access can be determined such that preambles (and/or tone hopping pattern) selected for the SR are not used.

(Option 2)

As another example of dedicated NPRACH resources, time (and/or frequency) domain resources can be independently allocated for SR operation. Here, time (and/or frequency) domain resources allocated for the SR can be determined such that they do not collide with physical uplink channels for other purposes. If collision occurs, operations of physical uplink channels for other purposes may be temporarily delayed or punctured in order to perform the SR operation.

(Option 3)

As another example of dedicated NPRACH resources, a codeword cover can be used. If NPRACH resources other than the codeword cover are shared with NPRACH resources for other purposes, a codeword cover for an SR can be used such that it can be distinguished from the codeword cover used for the conventional NPRACH. If codewords used for dedicated NPRACH resources are used to identify a cell, a codeword used in each cell can be determined not to overlap with that of a neighboring cell.

I-3. Grouping of Dedicated NPRACH Resources

Dedicated NPRACH resources can be divided into groups and used according to purposes. Here, a group may include one or more NB-IoT devices. If a group is configured to include only one NB-IoT device, the NB-IoT device performs contention-free SR transmission. If one or more NB-IoT devices are included in a group, the NB-IoT devices perform contention based SR transmission. Grouping may be performed using one of the following methods or a combination of one or more thereof.

(Method 1)

For example, dedicated NPRACH resources can be configured in such a manner that different resources are selected according to coverage levels. This may be for the purpose of providing a repetition level required according to each coverage level of an NB-IoT device. If an eNB does not separately configure a coverage level, an NB-IoT device can determine a coverage level thereof on the basis of a measured value such as RSRP and a threshold value indicated by a specific eNB. If the eNB configures a coverage level, the NB-IoT device can select dedicated NPRACH resources suitable for the coverage level. Here, if the coverage level determined by the eNB differs from a coverage level measured before the NB-IoT device performs SR transmission, the NB-IoT device can perform an operation for receiving dedicated NPRACH resources configured therefor.

(Method 2)

As another example, dedicated NPRACH resources can be determined to be identified by an ID of an NB-IoT device. Here, the ID of the NB-IoT device may be determined on the basis of the unique ID of the NB-IoT or determined as a value set by an eNB. This may be for the purpose of identifying dedicated NPRACH resources used between NB-IoT devices. If different dedicated NPRACH resources are configured for respective NB-IoT devices determined to perform SR transmission, the SR transmission can be contention-freely performed.

(Method 3)

As another example, dedicated NPRACH resources can be used to indicate the size of information to be transmitted by an NB-IoT device on uplink. Here, the NB-IoT device selects dedicated NPRACH resources through which the NB-IoT device will perform SR on the basis of the BSR thereof. Here, an eNB can indicate information about the criteria for selection to the NB-IoT through higher layer signaling. In this case, an operation of the NB-IoT device to additionally transmit the BSR when the eNB allocates an uplink grant can be omitted.

I-4. Configuration of Dedicated NPRACH Resources

Dedicated NPRACH resources can be configured by an eNB. Here, configuration related information can be indicated to an NB-IoT device through higher layer signaling. In addition, the NB-IoT device can maintain some of information acquired in an RRC connected state in an RRC idle state. According to the proposition, the NB-IoT device can acquire information about an SR in an RRC connected state and perform SR transmission in an RRC idle state using the information.

Dedicated NPRACH resources acquired in an RRC connected state can be used only for a specific period (e.g., $T_{SR}$) from a specific time (e.g., $n_0$). Accordingly, the dedicated NPRACH resources may be configured not to be used when the specific period $T_{SR}$ ends. Here, a time at which RRC connection release is triggered by an eNB can be used as an example of the specific time no. Here, information about the specific period $T_{SR}$ can be transmitted through higher layer signaling in a process in which the eNB provides information related to an SR to the NB-IoT device in the RRC connected state. According to this method, dedicated NPRACH resources for an SR can be controlled per NB-IoT device. Alternatively, the information about the specific period $T_{SR}$ can be transmitted from the eNB to the NB-IoT device through information that can be acquired in an RRC idle state, such as SIB. This method can transmit varying SR information even to NB-IoT devices in an RRC idle state while commonly controlling SR operations of all NB-IoT devices.

When an NB-IoT device fails in SR operation by a specific number of times $n_{try}$ or more, acquired dedicated NPRACH resources may not be used any more. Here, information about the specific number of times $n_{try}$ can be transmitted through higher layer signaling in a process in which the eNB provides information related to an SR to an NB-IoT device in an RRC connected state. Alternatively, the information about the specific number of times $n_{try}$ can be transmitted from the eNB to the NB-IoT device through information that can be acquired in an RRC idle state, such as SIB.

When the eNB intends to change an SR operation method in a situation in which some NB-IoT devices have already acquired SR related information, the eNB can indicate a change in SR operation through a signal that can be acquired by an NB-IoT device in an RRC idle state, such as SIB. For example, when the eNB indicates a change in SR information through SIB, NB-IoT devices may not use the existing information about the SR any more.

I-5. BSR Transmission

When SR is performed using dedicated NPRACH resources, BSR can be transmitted using the dedicated NPRACH resources. Specifically, an NB-IoT device can be assigned one or more dedicated NPRACH resources for an SR. Here, the resources may be determined to correspond to buffer states having different sizes. Information about the size of a buffer state corresponding to the index of each resource can be transmitted through higher layer signaling in a process in which the eNB delivers configuration with respect to an SR to an NB-IoT device in an RRC connected state. Alternatively, the information about the size of a buffer state corresponding to the index of each resource may be transmitted cell-commonly through a signal that can be acquired by an NB-IoT device in an RRC idle state, such as SIB.

If when the size of BSR cannot be identified through dedicated NPRACH resources, an NB-IoT device can transmit BSR thereof through the third message (i.e., MSG 3) in a random access procedure.

II. Second Disclosure

In this section, details necessary for an SR when an NB-IoT device is in an RRC connected state are described. Specifically, a case in which an additional uplink control channel for SR transmission is not present is considered in this section. In addition, a situation in which additional resources for SR transmission are allocated is considered in this section. Although a method of allocating resources using a physical channel carrying ACK/NACK when an uplink control channel for SR transmission is not present will be described, this is merely an example and the present invention can be extended and applied to other uplink channels. In addition, uplink resources additionally allocated for an SR are represented as SR resources.

II-1. SR Transmission During Downlink Procedure

An NB-IoT device can use a physical channel carrying ACK/NACK in order to transmit an SR. Specifically, when the NB-IoT device receives downlink data, the NB-IoT device transmits a HARQ (Hybrid Automatic Retransmit reQuest) ACK/NACK (acknowledgement/negative-acknowledgement) signal using NPUSCH format 2. Here, an SR can be included and transmitted in NPUSCH format 2 in this section.

When an SR is transmitted using NPUSCH format 2, NPUSCH format 2 including the SR and NPUSCH format 2 that does not include the SR can be transmitted through different radio resources. Accordingly, NPUSCH format 2 including the SR and NPUSCH format 2 that does not include the SR can be discriminated from each other using the radio resources.

Figure 11:
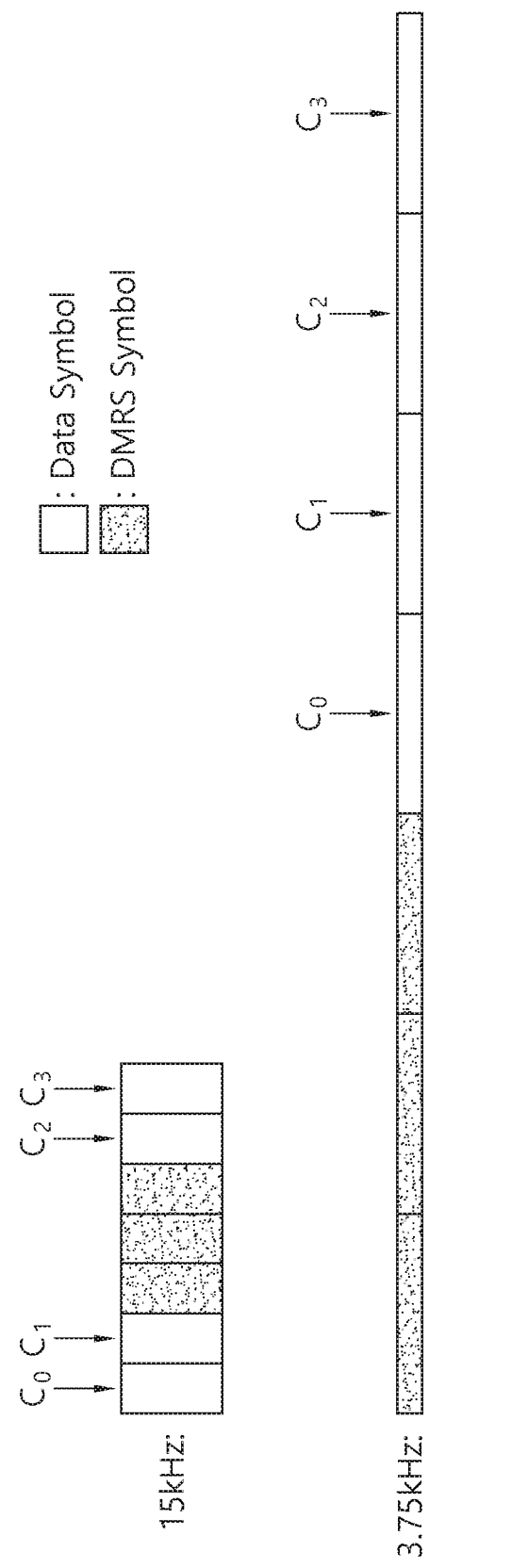
FIG. 11 is an illustration of an example in which a codeword cover is applied.

Here, a subcarrier index can be used to represent the SR using NPUSCH format 2. For example, an NB-IoT device can divide subcarrier resources for NPUSCH format 2 into subcarriers for SR transmission and subcarriers for other purposes. Alternatively, NPUSCH format 2 including the SR and NPUSCH format 2 that does not include the SR may be discriminated from each other on time resources, for example, using a subframe index. More specifically, an NB-IoT device may divide ACK/NACK timing delay for NPUSCH format 2 into first timing delay for SR transmission and second timing delay for other purposes and use the timing delays, for example. Alternatively, a codeword cover may be used to identify NPUSCH format 2 including the SR. A codeword cover can be applied as a resource unit (e.g., a symbol, a slot or a subframe) composed of one or more symbols in the time domain. Here, the codeword may not be applied when an SR is not transmitted and may be applied when an SR is transmitted in consideration of backward compatibility. As a specific example, when ACK/NACK is transmitted using NPUSCH format 2 in NB-IoT, a codeword cover of [$c_0$ $c_1$ $c_2$ $c_3$] can be applied to a data part. Here, a codeword may be generated in the form of [1 −1 1 −1] to satisfy orthogonality on the assumption that a codeword of [1 1 1 1] is used in transmission without an SR. FIG. 11 shows an example in which codeword covers are applied to a case in which a subcarrier spacing of 15 kHz is used and a case in which a subcarrier spacing of 3.75 kHz is used.

In addition, as a method for representing an SR using NPUSCH format 2, QPSK constellation may be used. For example, mapping may be performed using 1 and −1 when only an ACK/NACK signal is transmitted without an SR and mapping may be performed using j and −j when an ACK/NACK signal and an SR are transmitted together. Here, an NB-IoT device may conform to π/4 rotation rule as a conventional phase rotation rule irrespective of whether an ACK/NACK signal is transmitted. This may be for the purpose of achieving uniform DMRS transmission at all time while preventing PAPR from increasing.

A procedure for configuring radio resources necessary to perform SR may be one of the following methods.

(Method 1)

Distinguishable radio resources used to distinguish whether an SR is transmitted may be configured using DCI. Here, an NB-IoT device that monitors the DCI may be limited to an NB-IoT device configured to perform SR in an RRC connection establishment procedure. This may be for the purpose of identifying an NB-IoT device that cannot support SR operation and transmitting DCI. To this end, an NB-IoT device may need to transmit SR capability thereof to an eNB when or before RRC connection is established.

(Method 2)

Radio resources of an ACK/NACK signal used for SR transmission may be defined as an offset with respect to radio resources of an ACK/NACK signal used when an SR is not transmitted. Here, the value of the offset can be transmitted to an NB-IoT device through higher layer signaling in an RRC connection establishment procedure. Here, the NB-IoT device to which the offset is applied may be limited to an NB-IoT device configured to transmit an SR in an RRC connection establishment procedure. This may be for the purpose of allowing an eNB to check whether the NB-IoT device needs to transmit an SR and perform scheduling such that the SR does not collide with other radio resources. To this end, the NB-IoT device can transmit information about SR capability thereof to the eNB when or before RRC connection is established.

When the NB-IoT device is configured to transmit an SR in an RRC connection procedure, the NB-IoT device can determine whether to transmit the SR according to information indicated by DCI. This may be for the purpose of improving scheduling flexibility from the viewpoint of the eNB. When (Method 1) is used and a plurality of radio resources of NPUSCH format 2, indicated by DCI, are identical, the NB-IoT device may not perform SR transmission in corresponding ACK/NACK signal transmission. If (Method 2) is used, DCI may include a bit indicating whether an SR is transmitted.

II-3. Collision Handling

In this section, a method of selecting one of two SR resources when periods in which an SR can be transmitted collide when an NB-IoT device separately allocated uplink resources for SR transmission transmits SR using ACK/NACK resources upon reception of downlink data is described. Methods described below are applicable to cases in which collision between two SR resources occurs in some periods as well as cases in which collision between the two SR resources occurs in all periods.

As described above, when two differently configured two SR resources overlap, the NB-IoT device can select one of the SR resources and simultaneously transmit an ACK/NACK signal and an SR.

As a method, the NB-IoT device can abandon use of separately allocated dedicated SR resources and transmit an SR using resources for an ACK/NACK signal when two SR resources overlap. This may be for the purpose of preventing the NB-IoT device from repeatedly transmitting an SR and separately operating dedicated SR resources. Further, the eNB can dynamically configure uplink resources for utilization of resources optimized at the corresponding transmitting time.

On the other hand, when two SR resources overlap, the NB-IoT device can attempt to transmit an ACK/NACK signal and an SR using dedicated SR resources. This may be for the purpose of preventing the NB-IoT device from repeatedly transmitting an SR and preventing an operation of allocating separate resources for the ACK/NACK signal from being performed. In this case, bits for ACK/NACK resource scheduling included in DCI may include predetermined known bits (e.g., all zero value) in order to improve decoding performance or may be used for other purposes. If the bits for ACK/NACK resource scheduling are determined to be used for other purpose but the NB-IoT device does not require the purposes, the bits may be regarded as reserved bits and processed.

As another method of selecting one of two SR resources, the NB-IoT device may be configured to select one of the SR resources on the basis of a repetition number of each SR resource or a code rate. For example, the NB-IoT device may select an SR resource with a higher repetition number or an SR resource configured at a lower code rate. This may be for the purpose of securing SR transmission reliability. Here, if the two resources have the same repetition number or the same code rate, a resource may be determined using one of the above-described selection methods.

Distinguished from the above description, when SR resources configured differently through the two methods overlap, the NB-IoT device may perform transmission using both the resources. For example, the NB-IoT device may transmit only an ACK/NACK signal through resources configured for the ACK/NACK signal and transmit only an SR through dedicated SR resources. This may be for the purpose of transmitting an SR while maintaining ACK/NACK reliability. As another example, the NB-IoT device may transmit an SR through the dedicated SR resources and repeatedly transmit the SR using ACK/NACK resources at the same time. This may be for the purpose of improving SR reliability by repeatedly transmitting the SR.

II-4. SR Transmission According to Multiple HARQ Processes

In this section, a method of transmitting an SR using resources of an ACK/NACK signal when an NB-IoT device operates one or more HARQ processes is described.

Figure 12:
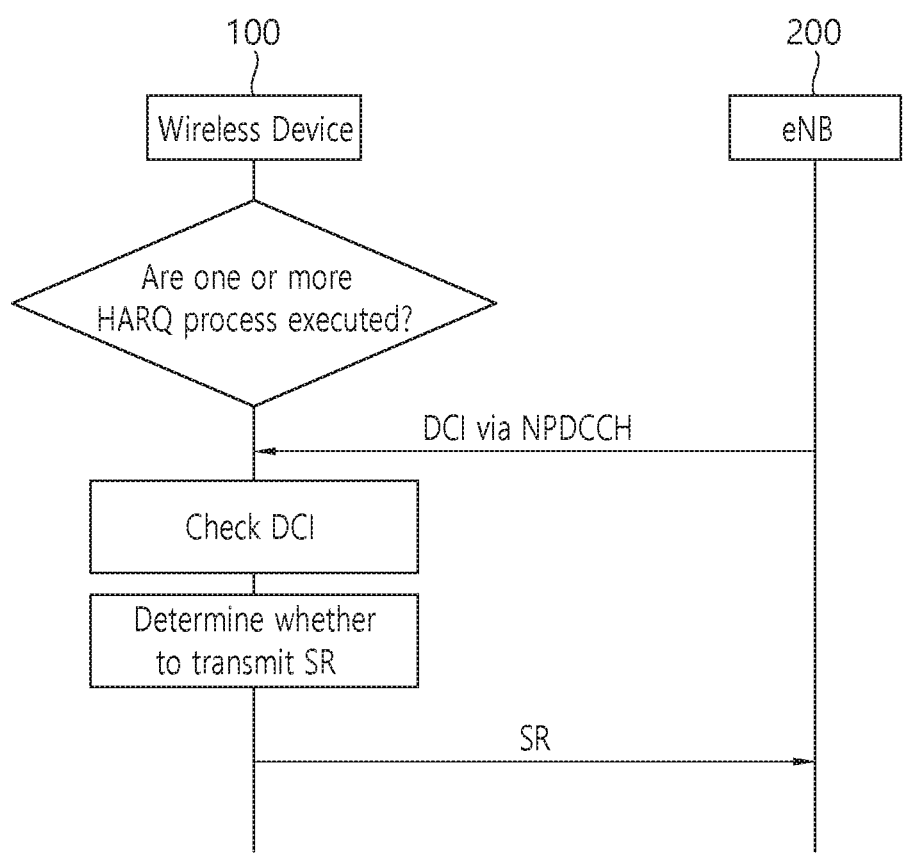
FIG. 12 is a flowchart illustrating a method for determining to transmit an SR.

FIG. 12 is a flowchart illustrating a method of determining whether to transmit an SR.

As shown in FIG. 12, an NB-IoT device checks whether one or more HARQ processes are operated.

The NB-IoT device checks DCI upon reception of the DCI through an NPDCCH.

In addition, the NB-IoT device determines whether to transmit an SR using resources for HARQ ACK/NACK signal transmission.

Here, one of the following methods may be used in order to reduce the number of cases in which ACK/NACK reliability decreases due to SR transmission.

(Method 1)

When a HARQ process is applied, SR transmission using ACK/NACK transmission resources can be selected on the basis of information indicated by a NDI (New Data Indicator) field in DCI. For example, SR transmission using ACK/NACK transmission resources may be performed only when new data is transmitted. This may be for the purpose of preventing repeated transmission of an SR when retransmission is performed once or more when retransmission is determined and securing reliability of ACK/NACK feedback in a retransmission stage. Alternatively, SR transmission using ACK/NACK transmission resources may be limited to a case in which retransmission is performed. This may be for the purpose of preventing the NB-IoT device from missing initially transmitted downlink data and losing an ACK/NACK signal transmission opportunity.

(Method 2)

When a HARQ process is applied, SR transmission using ACK/NACK transmission resources can be determined according to a RV (Redundancy Version) in DCI. For example, SR transmission can be performed only when a specific RV is indicated in DCI. Alternatively, SR transmission may not be performed when the specific RV is indicated in the DCI. Here, one or more RVs may be provided. In this case, an eNB can dynamically control whether an SR is transmitted without additional overhead increase.

(Method 3)

When two or more HARQ processes are applied, SR transmission using ACK/NACK transmission resources can be limited to a specific HARQ process ID. In this case, a HARQ process ID to be used can be indicated through higher layer signaling or dynamically indicated through DCI. Alternatively, the HARQ process ID to be used may be changed depending on the number of transmissions. For example, when a HARQ process ID used for SR transmission using ACK/NACK signal transmission resources during initial transmission is #0, HARQ process IDs may be determined in such a manner that the HARQ process ID number increases by one from #0.

II-5. Power Control

When an SR and an ACK/NACK signal are simultaneously transmitted, the number of transmitted bits increases and thus decoding reliability is likely to decrease. To solve such a problem, a method of performing power control when an SR and an ACK/NACK signal are simultaneously transmitted is proposed in this section.

When an SR and an ACK/NACK signal are simultaneously transmitted, a corresponding transport block may use higher power than in other cases.

Specifically, when a repetition number is 1 in an NB-IoT system, a value corresponding to Pcmax that is a maximum power value which can be used by an NB-IoT device for NPUSCH transmission can be used. This may be for the purpose of allowing NPUSCH transmission with higher power by improving a method of setting a maximum power value of an NPUSCH to a value less than Pcmax when a repetition number is 1 defined in the current standards.

Specifically, when a maximum power value that can be used for an ACK/NACK signal without an SR in an NB-IoT system is limited to Pcmax, simultaneous transmission of an SR and an ACK/NACK signal can be permitted such that the SR and the ACK/NACK signal are transmitted with a power value greater than Pcmax.

Here, when the SR and the ACK/NACK signal are simultaneously transmitted, a power value used therefor can be determined as an offset with respect to Pcmax and the offset value can be transmitted to the NB-IoT device through RRC signaling.

Here, when the SR and the ACK/NACK signal are simultaneously transmitted, a power value can be determined by a value Pcmax SR indicated through RRC signaling.

If the NB-IoT device does not transmit an SR even though it is configured to simultaneously transmit the SR and an ACK/NACK signal, the original power value may be used.

II-6. Repetition Number

When an SR is transmitted through NPUSCH format 2, the SR can be simultaneously transmitted using resources for an ACK/NACK signal or resources allocated only for SR. In this situation, different repetition levels may be configured in the respective cases. In this case, a repetition number of NPUSCH format 2 for SR transmission may be determined through one of the following methods.

A repetition number of an SR with an ACK/NACK signal can be determined as a larger one between a repetition number of the SR with the ACK/NACK signal and a repetition number for SR on dedicated resources.

ACK/NACK signal resources to which a larger repetition number is applied can be limited to ACK/NACK resources permitted for SR transmission. This may be for the purpose of preventing unnecessary repetition in the case of an ACK/NACK transport block through which SR transmission is not performed.

ACK/NACK signal resources to which a larger repetition number is applied can be all ACK/NACK resources. This may be for the purpose of preventing an NB-IoT device that misunderstands allocation of ACK/NACK transport block in which SR transmission is permitted from performing many repetitions to interfere with other NB-IoT devices or from performing less repetition to deteriorate decoding performance of an eNB.

II-7. SR without BSR Procedure

NPUSCH format 2 can include a 1-bit ACK/NACK signal basically. Accordingly, 1-bit information representing whether an SR is transmitted needs to be added to NPUSCH format 2 when the SR is simultaneously transmitted using resources for an ACK/NACK signal.

On the other hand, an on/off keying based method that identifies an SR according to whether a signal or a channel is transmitted can be used for an SR using dedicated SR resources. Accordingly, when the SR using the dedicated SR resources is transmitted using NPUSCH format 2, the aforementioned 1-bit ACK/NACK information and 1-bit additional information representing whether an SR is transmitted may not be required. Here, the aforementioned bit information that can be represented using NPUSCH format 2 may be used for other purposes. For example, when an NB-IoT device uses NPUSCH format 2 in order to transmit an SR, the aforementioned added bit information may be used for the NB-IoT device to request an uplink resource having a specific size. Here, one of the information represented by bits may be used for the purpose of operating an SR which requires a normal BSR procedure. If 1 bit can be further added in addition to information representing an SR using BSR, the bit may be used for the purpose of requesting an uplink grant that assumes a predetermined buffer size. In this case, the eNB can perform an operation of allocating an uplink grant suitable to a fixed buffer size in response to an SR request of the NB-IoT device. The NB-IoT device can omit a BSR procedure and immediately perform uplink data transmission fitted for the designated buffer size after reception of the response. If information of 2 bits or more can be additionally used in addition to the information representing an SR using BSR, each information can be used for the purpose of representing a buffer size intended to be requested. For example, when 3-bit information can be used, the information can be used to represent bit information having sizes of N1, N2 and N3.

If the NB-IoT device transmits an SR that does not require a BSR procedure, modulation and TBS (Transport block size) used in uplink data transmission process can use predefined values.

If the NB-IoT device transmits an SR that does not require a BSR procedure, the size of resources used in the frequency domain may be predetermined in order to obtain latency reduction effect. Specifically, the size of resources used in the frequency domain may be the number of subcarriers or the number of used PRBs. Here, the size of resources used in the frequency domain may be a fixed value determined in the standards. Alternatively, the size of resources used in the frequency domain may be a value set through RRC signaling.

Figure 13A:
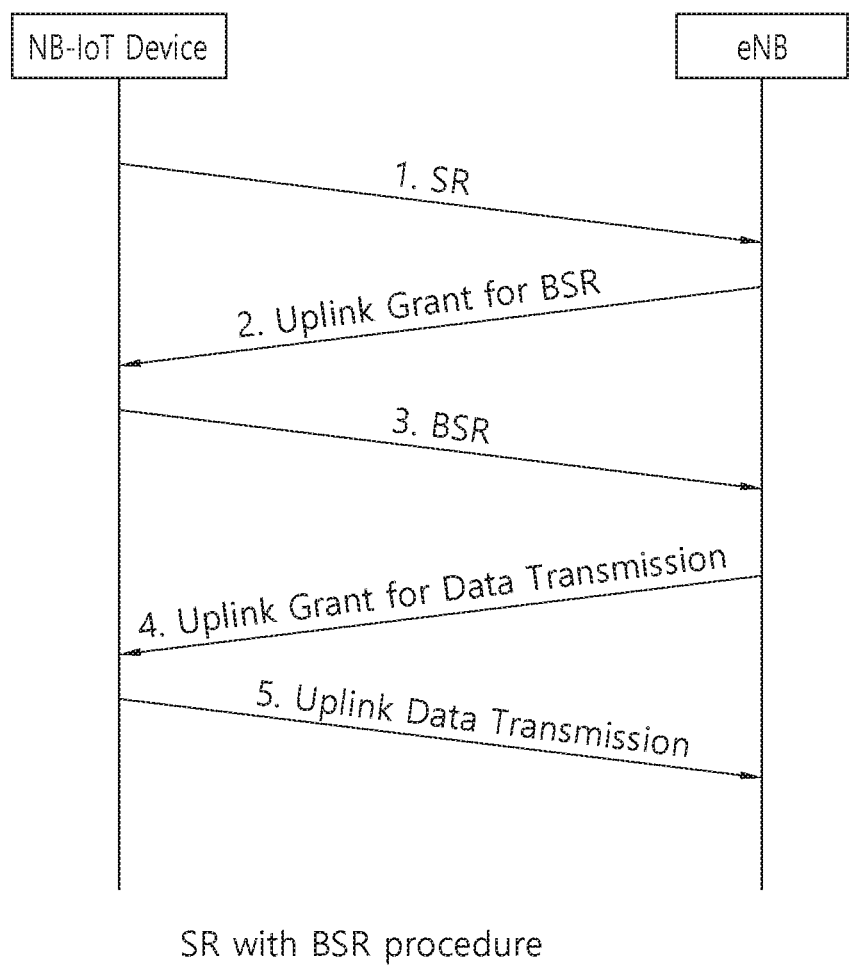
FIGS. 13A and 13B are illustrations of SR transmission procedures.
Figure 13B:
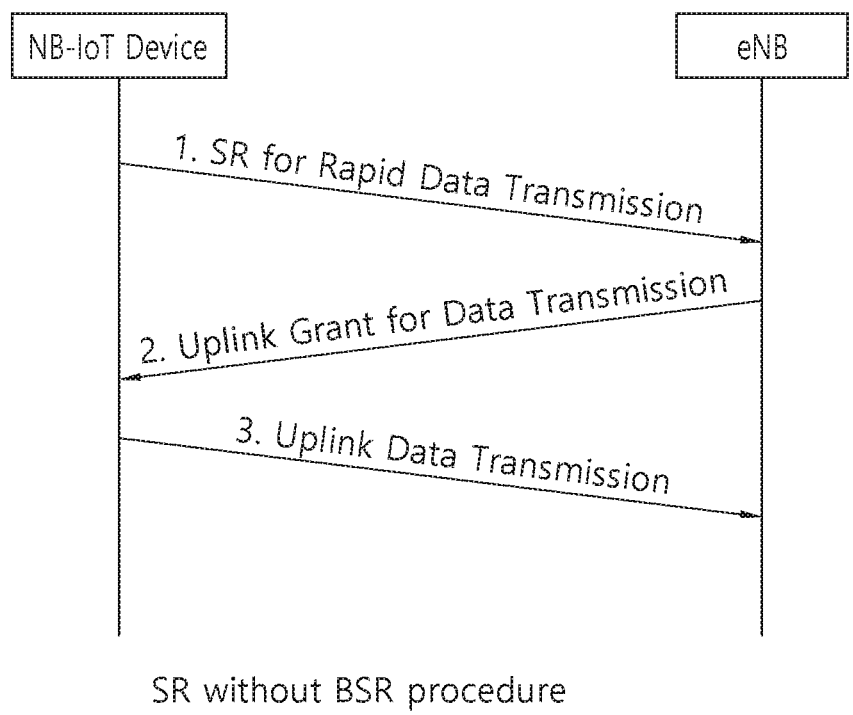

FIGS. 13A and 13B are illustrations of SR transmission procedures.

FIG. 13A shows an example of a procedure carried out when an NB-IoT device performs an SR that requires BSR. FIG. 13B shows an example of a procedure carried out when an NB-IoT device intends to transmit uplink data that does not require BSR and is fitted for a determined buffer size.

II-8. SR Counter and Prohibit Timer

In the conventional SR operation, a transmission time can be determined using an SR counter, an SR prohibit counter and an SR periodicity. In the case of the SR counter, counting starts from an initial SR transmission time, and when a counted value reaches dsr-TransMax because a response to an SR is not continuously received, an SR related procedure is stopped and a random access procedure starts. The SR periodicity refers to a period in which available dedicated SR resources are configured. The SR prohibit timer indicates a position of a dedicated SR resource in which the next SR transmission is permitted from a dedicated SR resource in which SR has been actually performed. The above-described operation is a method applicable when dedicated SR resources are used and a new method for determining an SR transmission time is required if an SR uses ACK/NACK signal resources. To achieve such an object, a method of applying the SR counter, the SR prohibit timer and the SR periodicity when an SR and an ACK/NACK signal are simultaneously transmitted is proposed in this section.

When an NB-IoT device transmits an SR using ACK/NACK resources during NPDSCH reception, the SR counter can increase by 1 whenever the NB-IoT device requests an SR.

If the value accumulated by the SR counter does not exceed a value indicated by dsr-TransMax even after reception of all NPDSCHs ends and when dedicated SR resources configured for the NB-IoT device are present, the NB-IoT device can continuously transmit the SR using the dedicated SR resources. Here, a time when the SR is transmitted using the dedicated SR resources can be determined on the basis of a position at which the dedicated SR resources are configured after a specific time from a last ACK/NACK signal transmission time.

Here, the SR may not be transmitted along with the last ACK/NACK signal when the last ACK/NACK signal is transmitted.

Here, the specific time may be determined by the SR prohibit timer.

Here, the specific time may be determined by a value additionally configured through higher layer signaling for the aforementioned operation. This may be for the purpose of sufficiently reflecting DRX timing of a search space in which an uplink grant can be received.

If the value accumulated by the SR counter exceeds the value indicated by dsr-TransMax before reception of all NPDSCHs ends, the NB-IoT device may not immediately start a random access procedure. The NB-IoT device may perform the random access procedure after a time when reception of all NPDSCHs ends.

Meanwhile, when the value accumulated by the SR counter reaches the value indicated by dsr-TransMax, the NB-IoT device may perform one of the following options in remaining ACK/NACK resource periods available for SR.

(Option 1)

The NB-IoT device can transmit no more SR through resources for ACK/NACK signals. This may be for the purpose of preventing excessive SR request of the NB-IoT device to reduce the influence on ACK/NACK signal reliability.

(Option 2)

The NB-IoT device can continuously transmit an SR through the resources for ACK/NACK signals. This may be for the purpose of increasing a probability that the NB-IoT device can receive an uplink grant without a random access procedure.

A time at which the NB-IoT device starts a random access procedure after NPDSCH reception may be determined by a position at which an NPRACH resource is configured after a specific time from the last ACK/NACK signal transmission time. For example, the time at which the random access procedure starts may correspond to a time at which the NPRACH resource is configured.

Here, an SR may not be transmitted along with the last ACK/NACK signal when the last ACK/NACK signal is transmitted.

Here, the specific time may be determined by the SR prohibit timer.

Here, the specific time may be determined by a value additionally set through higher layer signaling for the aforementioned operation. This may be for the purpose of sufficiently reflecting DRX timing of a search space in which an uplink grant can be received.

When the NB-IoT device transmits an SR using dedicated SR resources, the value of the SR counter does not reach the value indicated by dsr-TransMax, and an NPDCCH needs to be monitored for NPDSCH reception, the NB-IoT device can stop SR transmission using the dedicated SR resources until reception of the NPDSCH ends.

Here, the NB-IoT device can transmit the SR using ACK/NACK resources.

Here, the value of the SR counter is not initiated and a value of the SR counter with respect to SR transmission using resources for ACK/NACK signals can be accumulated on the basis of a value of the SR counter with respect to SR transmission using the dedicated SR resources.

When the NB-IoT device transmits the SR using the resources for ACK/NACK signals during NPDSCH reception, one of the following options may be performed.

(Option 1)

The value of the SR prohibit timer can be determined by reusing a value of the prohibit timer for SR transmission using the dedicated SR resources. Here, an SR transmission time can be determined on the basis of ACK/NACK signal resources that can be used for SR from closest ACK/NACK transmission timings after the time of the SR prohibit timer expires from a time when the NB-IoT device previously transmits an SR.

(Option 2)

The SR prohibit time may be ignored. Here, the NB-IoT device can transmit an SR on all ACK/NACK signal resources that can be used for SR.

When the NB-IoT device transmits an SR using resources for ACK/NACK signals during NPDSCH reception and the NB-IoT device has not acquired DCI within a specific time after transmission of the last ACK/NACK signal, If the SR counter does not reach dsr-TransMax, the NB-IoT device can start SR transmission using the dedicated SR resources. Here, the SR transmission start time can be determined on the basis of a closest dedicated SR resource after a specific time.

If the value of the SR counter is greater than a value indicated by dsr-TransMax, the NB-IoT device can start a random access procedure. Here, the RACH start time can be determined on the basis of a closest NPRACH resource after a specific time.

In the above description, the specific time may be a value set through a higher layer.

In the above illustrative description, although the methods have been described on the basis of the flowcharts using a series of the steps or blocks, the disclosure of the present specification is not limited to the sequence of the steps, and some of the steps may be performed at different sequences from the above-described steps or may be performed simultaneously with the steps. Furthermore, those skilled in the art will understand that the steps shown in the flowcharts are not exclusive and may include other steps or one or more steps of the flowcharts may be deleted without affecting the scope of the present invention.

The embodiment of the present invention may be achieved by various means, for example, hardware, firmware, software, or a combination thereof. This will be described in detail with reference to the drawings.

Figure 14:
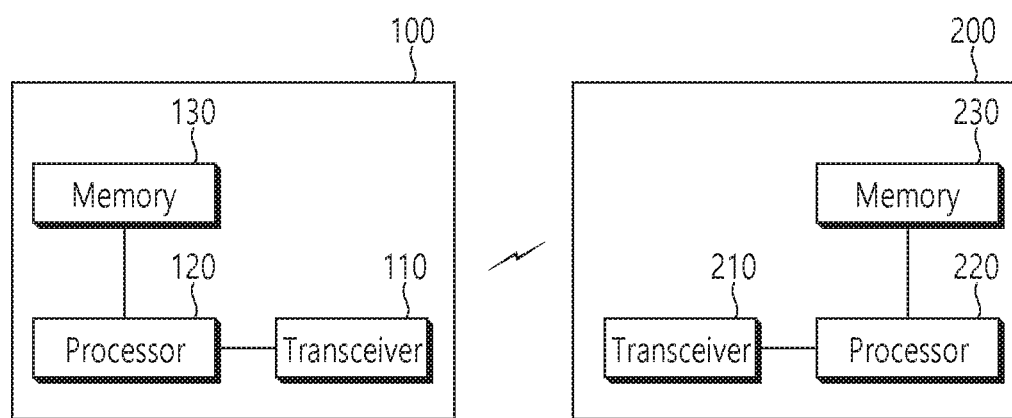
FIG. 14 is a block diagram illustrating a wireless device and an eNB in which the disclosure of the present application is implemented.

FIG. 14 is a block diagram illustrating a wireless device and an eNB in which the disclosure of the present specification is implemented.

Referring to FIG. 14, a wireless device 100 and an eNB 200 can implement the disclosure of the present specification.

The illustrated wireless device 100 includes a processor 101, a memory 102 and a transceiver 103. Similarly, the illustrated eNB 200 includes a processor 201, a memory 202 and a transceiver 203. The illustrated processors 101 and 201, the memories 102 and 202 and the transceivers 103 and 203 may be implemented as separate chips or at least two blocks/functions may be implemented through one chip.

The transceiver 103 or 203 includes a transmitter and a receiver. When a specific operation is performed, only the operation of one of the transmitter and the receiver may be performed or the operations of both the transmitter and the receiver may be performed. The transceiver 103 or 203 may include one or more antennas that transmit and/or receive RF signals. Further, the transceiver 103 or 203 may include an amplifier for amplifying a received signal and/or a transmitted signal and a bandpass filter for transmission in a specific frequency band.

The processor 101 or 201 may implement functions, processes and/or methods proposed in the present specification. The processor 101 or 201 may include an encoder and a decoder. For example, the processor 101 or 201 may perform operations according to the above description. The processor 101 or 201 may include an ASIC (Application-Specific Integrated Circuit), other chipsets, a logic circuit, a data processing device and/or a converter for converting a baseband signal and an RF signal to each other.

The memory 102 or 202 may include a ROM (Read-Only Memory), a RAM (Random Access Memory), a flash memory, a memory card, a storage medium and/or other storage devices.

Figure 15:
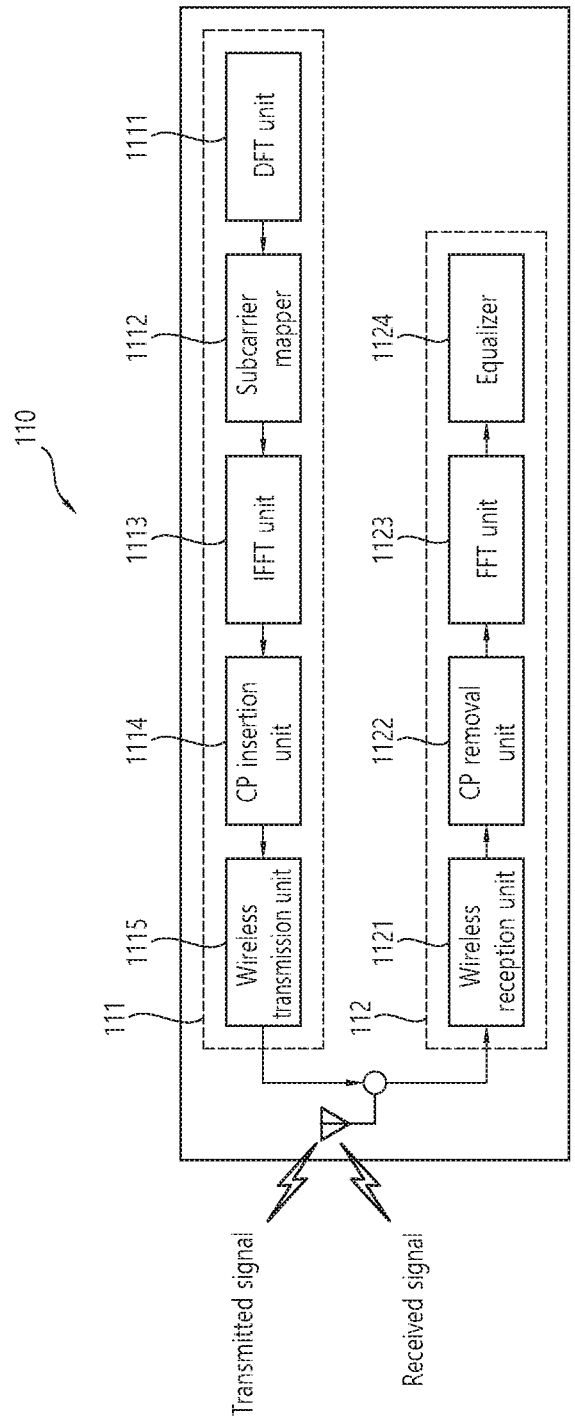
FIG. 15 is a detailed block diagram of a transceiver of the wireless device illustrated in FIG. 14.

FIG. 15 is a detailed block diagram of the wireless device illustrated in FIG. 14.

Referring to FIG. 15, a transceiver 110 includes a transmitter 111 and a receiver 112. The transmitter 111 includes a DFT (Discrete Fourier Transform) unit 1111, a subcarrier mapper 1112, an IFFT unit 1113, a CP insertion unit 1114 and a wireless transmission unit 1115. The transmitter 111 may further include a modulator. In addition, the transmitter 111 may further include a scramble unit (not shown), a modulation mapper (not shown), a layer mapper (not shown) and a layer permutator (not shown) which may be arranged before the DFT unit 1111. That is, to prevent PAPR (Peak-to-Average Power Ratio) increase, the transmitter 111 allows information to pass through the DFT unit 1111 before mapping a signal to a subcarrier. A signal spread (or pre-coded in the same sense) through the DFT unit 1111 is mapped to a subcarrier through the subcarrier mapper 1112 and then converted into a signal on the time domain through the IFFT (Inverse Fast Fourier Transform) unit 1113.

The DFT unit 1111 performs DFT on input symbols to output complex-valued symbols. For example, when Ntx symbols are input (Ntx is a natural number), a DFT size is Ntx. The DFT unit 1111 may be called a transform precoder. The subcarrier mapper 1112 maps the complex-valued symbols to subcarriers in the frequency domain. The complex-valued symbols can be mapped to resource elements corresponding to a resource block allocated for data transmission. The subcarrier mapper 1112 may be called a resource element mapper. The IFFT unit 1113 performs IFFT on input symbols to output a baseband signal for data, which is a time domain signal. The CP insertion unit 1114 copies a part of the rear part of the baseband signal for data and inserts the copied part into the front part of the baseband signal for data. ISI (Inter-Symbol Interference) and ICI (Inter-Carrier Interference) are prevented through CP insertion and thus orthogonality can be maintained even in multi-path channels.

On the other hand, the receiver 112 includes a wireless receiver 1121, a CP removal unit 1122, an FFT unit 1123 and an equalizer 1124. The wireless reception unit 1121, the CP removal unit 1122 and the FFT unit 1123 of the receiver 112 perform functions reverse to those of the wireless transmission unit 1115, the CP insertion unit 1114 and the IFFT unit 1113 of the transmitter 111. The receiver 112 may further include a demodulator.

What is claimed is:

1. A method of transmitting a scheduling request (SR), the method performed by a wireless device and comprising:
   receiving a higher layer signal including information regarding a plurality of narrowband physical random access channel (NPRACH) resources,
   wherein the plurality of the NPRACH resources include a first NPRACH resource for a scheduling request (SR); and
   transmitting a narrowband random access preamble in the first NPRACH resource of the received information, based on (i) that the wireless device needs to transmit the SR and (ii) that the wireless device need not transmit a narrowband physical uplink shared channel (NPUSCH) signal including hybrid automatic repeat request (HARQ) acknowledgment (ACK)/not-acknowledgment (NACK) information.

2. The method of claim 1,
wherein the first NPRACH resource includes a frequency resource,
wherein the frequency resource includes a subcarrier.

3. The method of claim 1,
wherein the narrowband random access preamble is not transmitted in a time resource overlapping a downlink channel.

4. The method of claim 1, further comprising:
receiving configuration information regarding a SR transmission without the HARQ ACK/NACK information.

5. The method of claim 1, further comprising:
transmitting the SR via a signal for the NPUSCH, based on that the HARQ ACK/NACK information needs to be transmitted.

6. The method of claim 1, further comprising:
determining a power for transmitting a narrowband random access preamble, based on that the SR needs to be transmitted.

7. A wireless device configured to transmit a scheduling request (SR), the wireless device comprising:
a transceiver;
at least one processor; and
at least one computer memory operably connectable to the at least one processor and storing instructions that, when executed by the at least one processor, perform operations comprising:
receiving, through the transceiver, a higher layer signal including information regarding a plurality of narrowband physical random access channel (NPRACH) resources, wherein the plurality of the NPRACH resources include a first NPRACH resource for a scheduling request (SR); and
transmitting, through the transceiver, a narrowband random access preamble in the first NPRACH resource of the received information, based on (i) that the wireless device needs to transmit the SR and (ii) that the wireless device need not transmit a narrowband physical uplink shared channel (NPUSCH) signal including hybrid automatic repeat request (HARQ) acknowledgment (ACK)/not-acknowledgment (NACK) information.

8. The wireless device of claim 7,
wherein the first NPRACH resource includes a frequency resource,
wherein the frequency resource includes a subcarrier.

9. The wireless device of claim 7,
wherein the narrowband random access preamble is not transmitted in a time resource overlapping a downlink channel.

10. The wireless device of claim 7, wherein the operations further comprise:
receiving, through the transceiver, configuration information regarding a SR transmission without the HARQ ACK/NACK information.

11. The wireless device of claim 7, wherein the operations further comprise:
transmitting, through the transceiver, the SR via a signal for the NPUSCH, based on that the HARQ ACK/NACK information needs to be transmitted.

12. The wireless device of claim 7, wherein the operations further comprise:
determining a power for transmitting a narrowband random access preamble, based on that the SR needs to be transmitted.

13. A base station configured to receive a scheduling request (SR), the base station comprising:
a transceiver;
at least one processor; and
at least one computer memory operably connectable to the at least one processor and storing instructions that, when executed by the at least one processor, perform operations comprising:
transmitting, through the transceiver, a higher layer signal including information regarding a plurality of narrowband physical random access channel (NPRACH) resources, wherein the plurality of the NPRACH resources include a first NPRACH resource for a scheduling request (SR); and
receiving, through the transceiver, a narrowband random access preamble in the first NPRACH resource of the information from a wireless device based on (i) that the wireless device needs to transmit the SR and (ii) that the wireless device need not transmit a narrowband physical uplink shared channel (NPUSCH) signal including hybrid automatic repeat request (HARQ) acknowledgment (ACK)/not-acknowledgment (NACK) information.

14. The base station of claim 13,
wherein the first NPRACH resource includes a frequency resource,
wherein the frequency resource includes a subcarrier.

15. The base station of claim 13,
wherein the narrowband random access preamble is not received in a time resource overlapping a downlink channel.

16. The base station of claim 13, wherein the operations further comprise:
transmitting, through the transceiver, configuration information regarding a SR transmission without the HARQ ACK/NACK information.

17. The base station of claim 13, wherein the operations further comprise:
receiving, through the transceiver, the SR via a signal for the NPUSCH, based on that the HARQ ACK/NACK information needs to be transmitted.

* * * * *